(12) United States Patent
Jeon

(10) Patent No.: US 11,424,535 B2
(45) Date of Patent: Aug. 23, 2022

(54) ELECTRONIC DEVICE FOR INCLUDING ANTENNA ARRAY

(71) Applicant: Samsung Electronics Co., Ltd., Suwon-si (KR)

(72) Inventor: Seung Gil Jeon, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 423 days.

(21) Appl. No.: 16/199,069

(22) Filed: Nov. 23, 2018

(65) Prior Publication Data

US 2019/0165470 A1    May 30, 2019

(30) Foreign Application Priority Data

Nov. 24, 2017 (KR) .......................... 10-2017-0158719

(51) Int. Cl.
*H01Q 3/26* (2006.01)
*H01Q 3/36* (2006.01)
(Continued)

(52) U.S. Cl.
CPC .......... *H01Q 3/2617* (2013.01); *H01Q 1/243* (2013.01); *H01Q 3/36* (2013.01); *H01Q 9/16* (2013.01);
(Continued)

(58) Field of Classification Search
CPC .. H01Q 21/0006; H01Q 21/065; H01Q 21/29; H01Q 21/293; H01Q 1/243; H01Q 3/2617; H01Q 21/006
See application file for complete search history.

(56) References Cited

U.S. PATENT DOCUMENTS 7,224,321 B2    5/2007  Chiang et al.
7,330,152 B2    2/2008  Zhang et al.
(Continued)

FOREIGN PATENT DOCUMENTS

CN    104377449 A    2/2015
CN    106104915 A    11/2016
(Continued)

OTHER PUBLICATIONS

International Search Report dated Feb. 27, 2019, issued in International Patent Application No. PCT/KR2018/014186.
(Continued)

*Primary Examiner* — Graham P Smith
(74) *Attorney, Agent, or Firm* — Jefferson IP Law, LLP

(57) ABSTRACT

An electronic device is provided. The electronic device includes a cover glass, a rear cover which faces away from the cover glass, and a plurality of communication devices that are interposed between the cover glass and the rear cover. Each of the plurality of communication devices comprises a printed circuit board (PCB), an antenna array positioned at the PCB, a dielectric substance positioned on one surface of the antenna array, a conductor positioned on an opposite surface of the antenna array, and a communication circuit electrically connected with the antenna array. The communication circuit is configured to feed the antenna array and transmit/receive a signal in a specified frequency band based on an electrical path formed through the antenna array.

22 Claims, 17 Drawing Sheets

(51) Int. Cl.

| | | |
|---|---|---|
| *H01Q 1/24* | (2006.01) | |
| *H01Q 9/16* | (2006.01) | |
| *H01Q 21/28* | (2006.01) | |
| *H01Q 21/29* | (2006.01) | |
| *H01Q 21/00* | (2006.01) | |
| *H01Q 21/06* | (2006.01) | |
| *H01Q 1/52* | (2006.01) | |
| *H04B 7/00* | (2006.01) | |

(52) U.S. Cl.
CPC ....... *H01Q 21/0006* (2013.01); *H01Q 21/065* (2013.01); *H01Q 21/28* (2013.01); *H01Q 21/29* (2013.01); *H01Q 21/293* (2013.01); *H01Q 1/52* (2013.01); *H04B 7/00* (2013.01)

(56) References Cited

U.S. PATENT DOCUMENTS

| | | | |
|---|---|---|---|
| 8,368,602 | B2 | 2/2013 | Hill et al. |
| 8,786,515 | B2 | 7/2014 | Paradiso et al. |
| 8,988,297 | B2 | 3/2015 | Leung et al. |
| 9,578,149 | B2 | 2/2017 | Moon et al. |
| 9,692,114 | B2 | 6/2017 | Zhao et al. |
| 9,929,472 | B2 | 3/2018 | Rojanski et al. |
| 9,998,576 | B2 | 6/2018 | Kim et al. |
| 10,218,082 | B2 | 2/2019 | Zhao et al. |
| 10,219,389 | B2 * | 2/2019 | Islam ................ H01Q 19/32 |
| 10,297,900 | B2 | 5/2019 | Lee et al. |
| 10,381,736 | B2 | 8/2019 | Jung et al. |
| 10,530,912 | B2 | 1/2020 | Moon et al. |
| 10,840,583 | B2 * | 11/2020 | Lee ................ H01Q 9/0407 |
| 10,992,023 | B2 * | 4/2021 | Hong ................ H01Q 1/2283 |
| 11,114,747 | B2 * | 9/2021 | Ham ................ H01Q 9/065 |
| 2007/0229357 | A1 | 10/2007 | Zhang et al. |
| 2011/0122036 | A1 | 5/2011 | Leung et al. |
| 2011/0300907 | A1 | 12/2011 | Hill et al. |
| 2013/0050055 | A1 | 2/2013 | Paradiso et al. |
| 2013/0147664 | A1 * | 6/2013 | Lin ................ H01Q 13/085 342/372 |
| 2013/0306363 | A1 | 11/2013 | Yukimasa |
| 2015/0084814 | A1 | 3/2015 | Rojanski et al. |
| 2016/0043470 | A1 | 2/2016 | Ko et al. |
| 2016/0087348 | A1 | 3/2016 | Ko et al. |
| 2016/0308563 | A1 * | 10/2016 | Ouyang ................ H01Q 25/005 |
| 2016/0352000 | A1 | 12/2016 | Ohno et al. |
| 2016/0359223 | A1 | 12/2016 | Zhao et al. |
| 2017/0012359 | A1 | 1/2017 | Jung et al. |
| 2017/0125901 | A1 * | 5/2017 | Sharawi ................ H01Q 1/243 |
| 2017/0155185 | A1 | 6/2017 | Hong et al. |
| 2017/0222333 | A1 | 8/2017 | Sudo et al. |
| 2017/0302771 | A1 | 10/2017 | Kim et al. |
| 2017/0309991 | A1 * | 10/2017 | Noori ................ H01Q 1/241 |
| 2018/0034134 | A1 * | 2/2018 | Dalmia ................ H01Q 19/30 |
| 2018/0323507 | A1 | 11/2018 | Sharawi et al. |
| 2018/0342801 | A1 | 11/2018 | Sharawi et al. |
| 2019/0273308 | A1 | 9/2019 | Lee et al. |

FOREIGN PATENT DOCUMENTS

| | | |
|---|---|---|
| CN | 106575815 A | 4/2017 |
| CN | 106972238 A | 7/2017 |
| KR | 10-2015-0102480 A | 9/2015 |
| KR | 10-2017-0048586 A | 5/2017 |
| KR | 10-2017-0119392 A | 10/2017 |
| WO | 2006/015215 A2 | 2/2006 |
| WO | 2012/153282 A1 | 11/2012 |
| WO | 2016/126016 A1 | 8/2016 |
| WO | 2017/119643 A1 | 7/2017 |

OTHER PUBLICATIONS

Extended European Search Report dated Aug. 5, 2020, issued in European Patent Application No. 18880546.9.
Chinese Office Action dated Mar. 29, 2021, issued in Chinese Patent Application No. 201880074543.4.
Korean Office Action dated Sep. 13, 2021, issued in Korean Patent Application No. 10-2017-0158719.
Indian Office Action dated Apr. 20, 2022, issued in Indian Patent Application No. 202017013937.

* cited by examiner

ELECTRONIC DEVICE FOR INCLUDING ANTENNA ARRAY

CROSS-REFERENCE TO RELATED APPLICATION(S)

This application is based on and claims priority under 35 U.S.C. § 119(a) of a Korean patent application number 10-2017-0158719, filed on Nov. 24, 2017, in the Korean Intellectual Property Office, the disclosure of which is incorporated by reference herein its entirety.

BACKGROUND

1. Field

The disclosure relates to a technology for radiating a signal in a specific direction.

2. Description of Related Art

An electronic device, such as a smartphone, a wearable device, or the like, which is equipped with an antenna, has been widely supplied as mobile communication technologies develop. The electronic device may transmit/receive various kinds of data (e.g., a message, a photo, a video, a music file, a game, and the like) through an antenna. In particular, since an antenna array has an effective isotropically radiated power (EIRP) greater than one antenna, the antenna array may transmit/receive various kinds of data more effectively.

In addition to the antenna array, other part(s) may be positioned at the electronic device. For example, a display, a printed circuit board (PCB), or the like may be stacked above the antenna array within the electronic device. The display may output various kinds of content (e.g., a photo, a video, and the like), and an application processor (AP), a memory, and the like may be mounted on the PCB.

The above information is presented as background information only to assist with an understanding of the disclosure. No determination has been made, and no assertion is made, as to whether any of the above might be applicable as prior art with regard to the disclosure.

SUMMARY

As the size of the electronic device becomes small-sized, a separation distance between the antenna array and the other part(s) may become very short. Since the separation distance between the antenna array and the other part(s) may become very short, the other part(s) may have an influence on a signal which the antenna array radiates.

Aspects of the disclosure are to address at least the above-mentioned problems and/or disadvantages and to provide at least the advantages described below. Accordingly, an aspect of the disclosure is to provide an electronic device for solving the above-described problem and problems brought up in this specification.

For example, the antenna array may radiate a signal in a specific direction, but the other part(s) may distort a direction in which the antenna array radiates the signal. As such, the electronic device may fail to radiate a signal in a specific direction, or signal transmission/reception performance in the specific direction may be markedly reduced.

Alternatively, in the case where the other part(s) distorts a beam pattern of the antenna array, a region (e.g., a null region) where a signal is not radiated may occur.

Additional aspects will be set forth in part in the description which follows and, in part, will be apparent from the description, or may be learned by practice of the presented embodiments.

In accordance with an aspect of the disclosure, an electronic device is provided. The electronic device comprises a cover glass, a rear cover which faces away from the cover glass, and a plurality of communication devices that are interposed between the cover glass and the rear cover. Each of the plurality of communication devices comprises a printed circuit board (PCB), an antenna array positioned at the PCB, a dielectric substance positioned on a first surface of the antenna array, a conductor positioned on a second surface of the antenna array, the second surface being opposite to the first surface of the antenna array, and a communication circuit electrically connected with the antenna array. The communication circuit is configured to feed the antenna array and transmit/receive a signal in a specified frequency band based on an electrical path formed through the antenna array.

In accordance with another aspect of the disclosure, a communication device is provided. The communication device comprises a printed circuit board (PCB), a plurality of radiators positioned at the PCB, a dielectric substance positioned on a first side of the plurality of radiators, a conductor positioned on a second side of the plurality of radiators, the second side being opposite to the first side of the plurality of radiators, and a communication circuit electrically connected with the plurality of radiators. The communication circuit is configured to feed the plurality of radiators and transmit/receive a signal in a specified frequency band based on an electrical path formed through the plurality of radiators.

In accordance with another aspect of the disclosure, an electronic device is provided. The electronic device comprises a housing comprising a front plate, a rear plate facing away from the front plate, and a side member surrounding a space between the front plate and the rear plate, a touchscreen display exposed through the front plate, a first printed circuit board (PCB) that is parallel to both the touchscreen display and the rear plate, the first PCB being interposed between the touchscreen display and the rear plate and spaced from the front plate by a first distance, a second PCB that is parallel to both the front plate and the rear plate, the second PCB being interposed between the front plate and the rear plate and spaced from the front plate by a second distance longer than the first distance, the second PCB overlapping partially with the touchscreen display when viewed from the front plate, an antenna array including a plurality of antenna elements positioned in a direction parallel to a portion of the side member along a side surface of the second PCB, a conductive structure interposed between the antenna array and the rear plate, a dielectric substance structure interposed between the antenna array and the front plate, a wireless communication circuit electrically connected with the antenna array and configured to transmit/receive a signal in a frequency band ranging from 20 GHz to 40 GHz, and a processor electrically connected with the touchscreen display and the wireless communication circuit.

According to various embodiments of the disclosure, signal transmission/reception performance may be improved. Also, according to various embodiments of the disclosure, a region where a signal is not radiated may be prevented from occurring.

A variety of other effects directly or indirectly understood through this disclosure may be provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
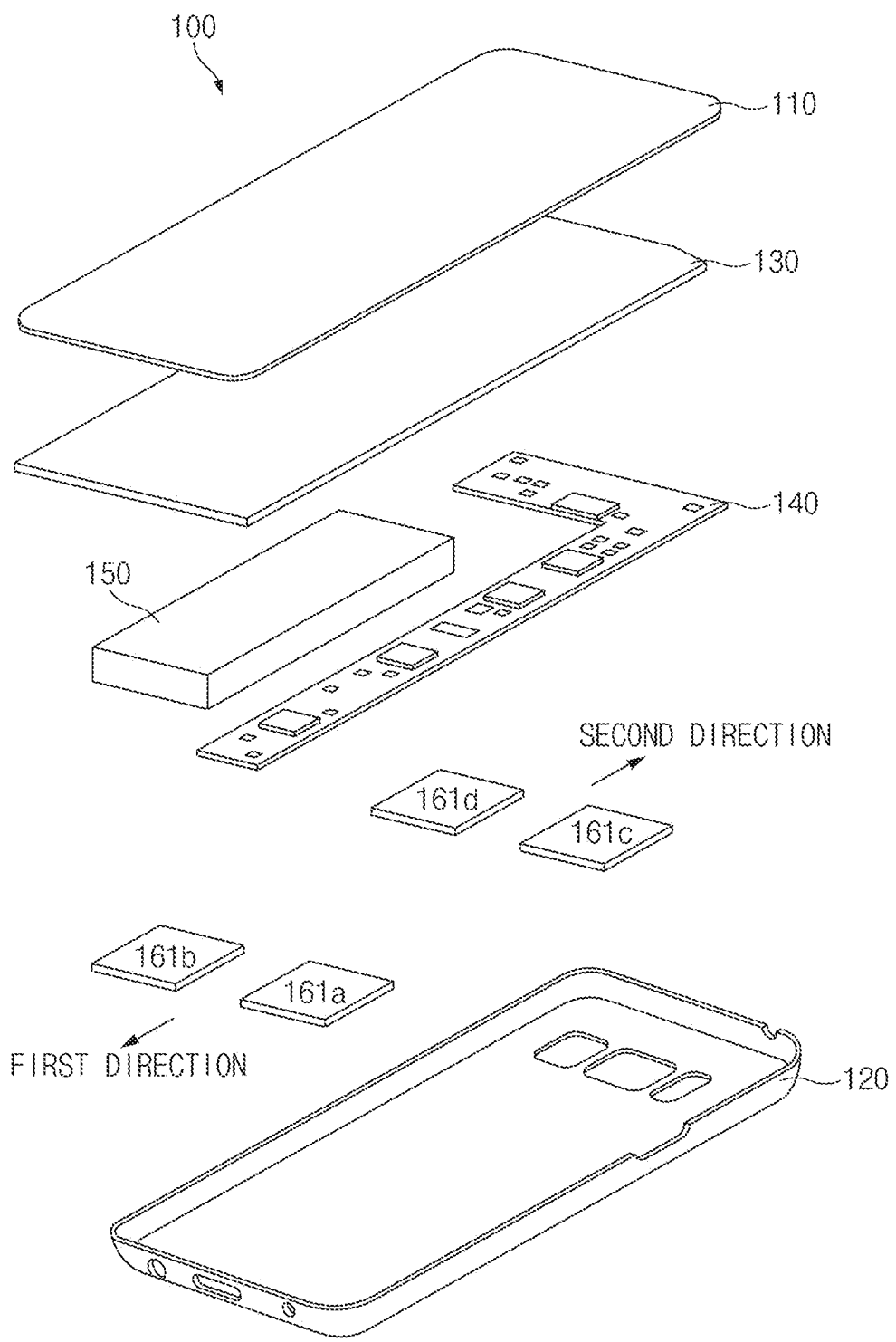
FIG. 1 is an exploded perspective view of an electronic device according to an embodiment of the disclosure.

FIG. 1 is an exploded perspective view of an electronic device according to an embodiment of the disclosure.

Referring to FIG. 1, an electronic device 100 may include a cover glass 110, a rear cover 120, a display 130, a first printed circuit board (PCB) 140, a battery 150, and a plurality of communication devices 161a, 161b, 161c, and 161d.

According to various embodiments, the cover glass 110 (or a front plate) may transmit light generated by the display 130. Also, a user may touch a portion (e.g., a finger) of his/her body on the cover glass 110 to perform a touch (including a contact using an electronic pen). For example, the cover glass 110 may be formed of tempered glass, reinforced plastics, a flexible polymer material, or the like. According to an embodiment, the cover glass 110 may be also referred to as a "glass window."

According to various embodiments, the rear cover 120 may be coupled with the cover glass 110. As the rear cover 120 is coupled with the cover glass 110, various kinds of parts (e.g., the display 130 and the first PCB 140) included in the electronic device 100 may be protected against an external impact. According to an embodiment, the rear cover 120 may be formed of tempered glass, plastic, and/or metal.

According to various embodiments, the rear cover 120 may include a rear plate (not illustrated), and a side member (not illustrated) surrounding a space between the rear plate and the cover glass 110. In this case, the rear plate and the side member may be removable, or the rear plate and the side member may be coupled to form an integral rear cover.

According to various embodiments, the display 130 may be interposed between the cover glass 110 and the rear cover 120. The display 130 may be electrically connected with the first PCB 140, and may output content (e.g., a text, an image, a video, an icon, a widget, a symbol, or the like) or may receive a touch input (e.g., a touch, a gesture, a hovering, or the like) from the user.

According to various embodiments, various electronic parts, various elements, or various printed circuits, or the like of the electronic device 100 may be mounted on the first PCB 140. For example, an application processor (AP), a plurality of communication processors (CPs) (or modems), a memory, and the like may be mounted on the first PCB 140. According to an embodiment, the plurality of CPs may be processors supporting different communication standards. For example, the plurality of CPs may include a first CP and a second CP. The first CP may be a 4th generation (4G) CP supporting 4G mobile communication, and the second CP may be a 5th generation (5G) CP supporting 5G mobile communication.

According to various embodiments, at least one communication circuit may be positioned at the first PCB 140. The communication circuit may include communication circuits supporting a specified communication standard. For example, the at least one communication circuit may include a first communication circuit and a second communication circuit. The first communication circuit may be an inter frequency integrated circuit (IFIC) supporting 5G mobile communication, and the second communication circuit may be a radio frequency integrated circuit (RFIC) supporting 4G mobile communication. In the disclosure, the first PCB 140 may be referred to as a "first PCB", a "main PCB," a "main board," or a "printed board assembly" (PBA).

According to various embodiments, the battery 150 may convert chemical energy and electrical energy bidirectionally. For example, the battery 150 may convert chemical energy into electrical energy and may supply the converted electrical energy to the display 130 and various components or modules mounted on the first PCB 140. Alternatively, the battery 150 may convert and store electrical energy supplied from the outside into chemical energy. According to an embodiment, a power management module for managing the charging and discharging of the battery 150 may be included in the first PCB 140.

Figure 2A:
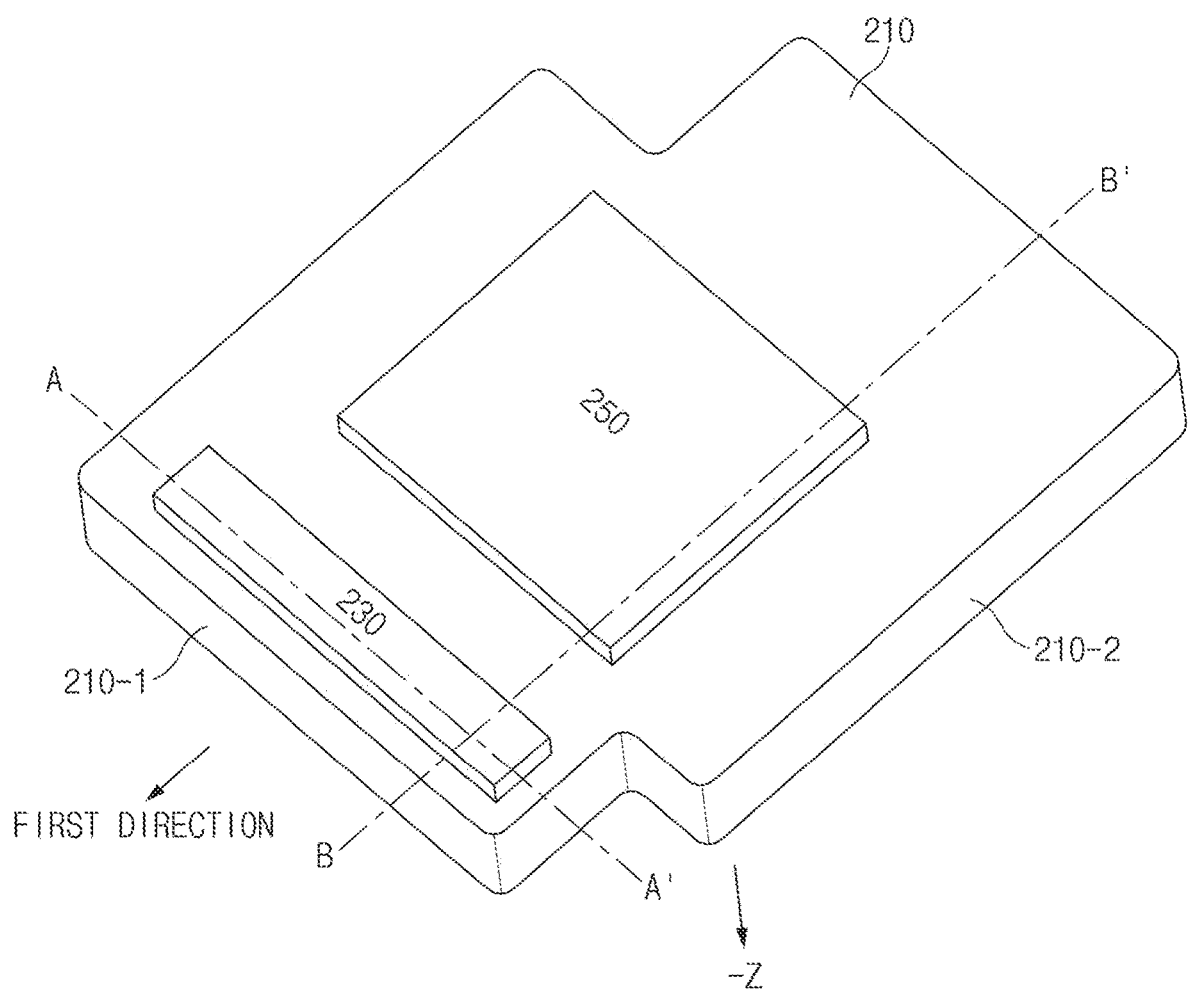
FIG. 2A is an enlarged view of a first communication device according to an embodiment of the disclosure.
Figure 2B:
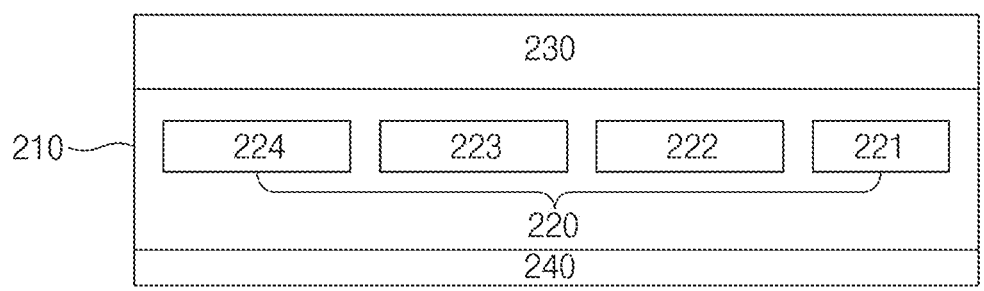
FIG. 2B is a sectional view of a first communication device according to an embodiment of the disclosure.

According to various embodiments, each of the plurality of communication devices 161*a*, 161*b*, 161*c*, and 161*d* may include a communication circuit (e.g., a communication circuit 250 of FIG. 2A) and an antenna array (e.g., a first antenna array 220 of FIG. 2B). The communication circuit 250 may feed the first antenna array 220 to transmit/receive a communication signal (e.g., a signal of a frequency band ranging from 20 GHz to 70 GHz). In the disclosure, the communication circuit 250 may be referred to as a "5G RFIC." According to various embodiments, the communication circuit 250 may be positioned on the first PCB 140.

According to various embodiments, the communication circuit 250 may transmit/receive a signal of a specific direction by feeding the plurality of communication devices 161*a*, 161*b*, 161*c*, and 161*d*, respectively. For example, the electronic device 100 may transmit/receive a signal in a first direction by using a first communication device 161*a* and a second communication device 161*b*. For another example, the electronic device 100 may transmit/receive a signal in a second direction by using a third communication device 161*c* and a fourth communication device 161*d*. In the disclosure, the first direction and the second direction may refer to any direction in which the plurality of communication devices 161*a*, 161*b*, 161*c*, and 161*d* may transmit/receive a signal.

According to various embodiments, the embodiment illustrated in FIG. 1 is exemplary, and the embodiments of the disclosure are not limited to the illustration of FIG. 1. For example, the number of the plurality of communication devices 161*a*, 161*b*, 161*c*, and 161*d* included in the FIG. 1, locations of the plurality of communication devices 161*a*, 161*b*, 161*c*, and 161*d*, and the like are not limited to the illustration of FIG. 1.

In an electronic device according to a comparative example, parts in the electronic device such as a display may affect a beam pattern or the electric field strength of a signal. For example, the parts may distort a direction in which the electronic device according to the comparative example may radiate a signal, and a beam pattern. As such, the electronic device according to the comparative example may fail to radiate a signal in a specific direction, or signal transmission/reception performance in the specific direction may be reduced. In the disclosure, the beam pattern may indicate the electric field strength of a signal which an antenna array radiates.

In the electronic device according to the comparative example, permittivity of a cover glass may be different from permittivity of a rear cover. For example, the cover glass may be formed of glass, and the rear cover may be formed of plastic. Since the permittivity of the cover glass is different from the permittivity of the rear cover, a direction in which a signal is radiated or a beam pattern may be distorted in the process where the signal passes through the cover glass and the rear cover. In particular, the size of the beam pattern may decrease due to the discontinuity of permittivities occurring at a specific portion (e.g., in the vicinity of a contact portion of the cover glass and the rear cover). The quantity of a signal radiated through a region (e.g., a null region) where the size of the beam pattern decreases may be small.

According to an embodiment of the disclosure, a dielectric substance (e.g., a dielectric substance 230 of FIG. 2B) and a conductor (e.g., a conductor 240 of FIG. 2B) may be mounted in each of the plurality of communication devices 161*a*, 161*b*, 161*c*, and 161*d* in consideration of the influence of the parts. The dielectric substance 230 and the conductor 240 may change a direction, in which the plurality of communication devices 161*a*, 161*b*, 161*c*, and 161*d* may radiate a signal, and a beam pattern to a specified direction in consideration of parts such as the display 130, the cover glass 110, or the rear cover 120. As such, the electronic device 100 according to an embodiment of the disclosure may radiate a signal in a specific direction (e.g., the first direction and the second direction), and may improve signal transmission/reception performance of the direction.

In the disclosure, the plurality of communication devices 161*a*, 161*b*, 161*c*, and 161*d* illustrated in FIG. 1 may be mounted in a tablet, a wearable device, a router, or the like in addition to the electronic device 100. Also, in the disclosure, the description given with reference to FIG. 1 may be identically applied to components having the same reference numerals/marks as the electronic device 100 described with reference to FIG. 1.

FIG. 2A is an enlarged view of a first communication device according to an embodiment of the disclosure. FIG. 2A is a view for describing a structure of the first communication device 161*a* in detail.

FIG. 2B is a sectional view of a first communication device according to an embodiment of the disclosure. FIG. 2B shows a cross section of a communication device taken along a line A-A' of FIG. 2A.

Figure 2C:
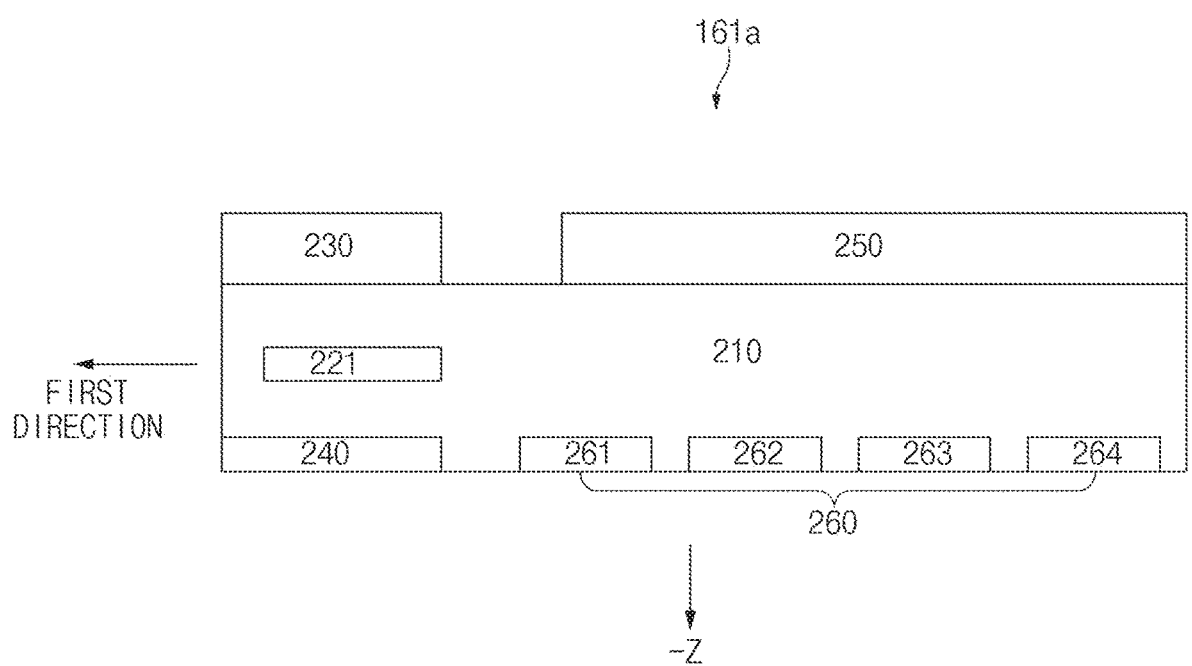
FIG. 2C is a sectional view of a first communication device according to an embodiment of the disclosure.

FIG. 2C is a sectional view of a first communication device according to an embodiment of the disclosure. FIG. 2C shows a cross section of a communication device taken along a line B-B' of FIG. 2A.

Referring to FIGS. 2A, 2B, and 2C, the first communication device 161*a* may include a second PCB 210, the first antenna array 220, the dielectric substance 230, the conductor 240, the communication circuit 250, and a second antenna array 260 that includes a plurality of second radiators 261, 262, 263, and 264. In the disclosure, the dielectric substance 230 may be referred to as a dielectric substance structure, and the conductor 240 may be referred to as a conductor structure.

According to various embodiments, the first antenna array 220 may be mounted at the second PCB 210. According to an embodiment, the second PCB 210 may include a plurality of layers, and at least any one of the plurality of layers may include a dielectric substance (e.g., plastic). In the disclosure, the second PCB 210 may be referenced as a "5G module PCB."

According to various embodiments, the first antenna array 220 may be positioned on a periphery of the second PCB 210. For example, as illustrated in FIG. 2A, the first antenna array 220 may be positioned adjacent to a first side surface 210-1 of the second PCB 210. Although not illustrated in FIG. 2A, the first antenna array 220 may be positioned adjacent to a second side surface 210-2 of the second PCB 210.

According to various embodiments, the first antenna array 220 may include a plurality of first radiators 221, 222, 223, and 224. Each of the plurality of first radiators 221, 222, 223, and 224 may be positioned in the second PCB 210. For example, each of the plurality of first radiators 221, 222, 223, and 224 may not be exposed to the outside of the second PCB 210 because the plurality of first radiators 221, 222, 223, and 224 are positioned in the second PCB 210. In the disclosure, a radiator may be referred to as an "antenna element."

According to various embodiments, the first communication device 161a may include the second antenna array 260. The second antenna array 260 may be positioned on a lower surface (or a surface facing the rear cover 120) of the second PCB 210, or may be positioned adjacent to the lower surface.

According to various embodiments, a direction of a signal which the second antenna array 260 may transmit/receive may be different from a direction of a signal which the first antenna array 220 may transmit/receive. For example, the second antenna array 260 may radiate a signal mainly in a-z direction, and the first antenna array 220 may radiate a signal in the first direction as a main radiation direction.

According to various embodiments, the dielectric substance 230 may be positioned above the first antenna array 220. The conductor 240 (e.g., metal) may be positioned below the first antenna array 220. According to various embodiments, the conductor 240 may be positioned on the same plane as the second antenna array 260.

According to various embodiments, in FIGS. 2A to 2C, a shape of the first communication device 161a, a configuration of the first communication device 161a, the number of the plurality of first radiators 221, 222, 223, and 224, locations of the plurality of first radiators 221, 222, 223, and 224, and the like are exemplary, and the embodiments of the disclosure are not limited to the illustration of FIGS. 2A to 2C. Also, in the disclosure, the description of the first communication device 161a given with reference to FIGS. 2A to 2C may be identically applied to the second communication device 161b, the third communication device 161c, and the fourth communication device 161d.

Figure 3:
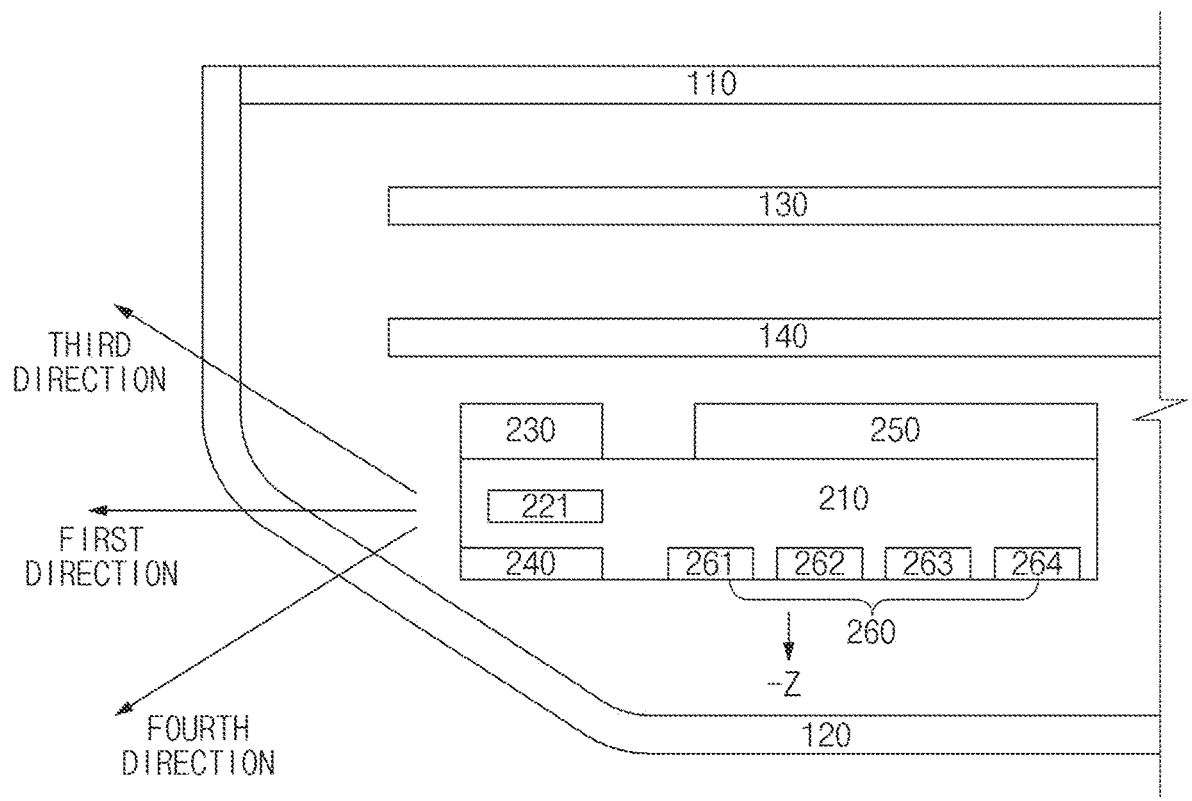
FIG. 3 is a sectional view of an electronic device according to an embodiment of the disclosure.

FIG. 3 is a sectional view of an electronic device according to an embodiment of the disclosure. FIG. 3 is a sectional view of the electronic device 100 where the first communication device 161a illustrated in FIG. 2A is mounted.

In an electronic device according to a comparative example, permittivity of a cover glass may be different from permittivity of a rear cover. Since the permittivity of the cover glass is different from the permittivity of the rear cover, a direction in which a signal is radiated or a beam pattern may be distorted in the process where the signal passes through the cover glass and the rear cover. For example, the size of the beam pattern may decrease due to discontinuity of permittivities occurring at a specific portion (e.g., in the vicinity of a contact portion of the cover glass and the rear cover). The quantity of a signal radiated through a region (e.g., a null region) where the size of the beam pattern decreases may be small.

Referring to FIG. 3, as the dielectric substance 230 is mounted at the first communication device 161a according to various embodiments of the disclosure, the first communication device 161a may make attenuation of a signal small due to the null region.

According to various embodiments of the disclosure, as the conductor 240 is mounted at the first communication device 161a, the first communication device 161a may radiate a signal mainly in a third direction. For example, the conductor 240 may reflect a signal radiated from the first antenna array 220, and thus, a main radiation direction of the signal radiated from the first antenna array 220 may be changed to the third direction. The third direction may be only a main direction in which the first antenna array 220 radiates a signal, and the first antenna array 220 may also radiate a signal, the strength of which is weaker than in the third direction, in the first direction and a fourth direction. As such, a signal which the first antenna array 220 radiates may form a beam pattern of a specific shape (e.g., an oval shape).

According to various embodiments of the disclosure, a main radiation direction of the first antenna array 220 may be changed to the third direction by the conductor 240. In this case, the strength of a signal which the first antenna array 220 radiates in the fourth direction may be weaker than the strength of a signal which the first antenna array 220 radiates in the third direction when the first direction is a main radiation direction. In this case, the second antenna array 260 may cover a fourth-direction signal which decreases.

Figure 4A:
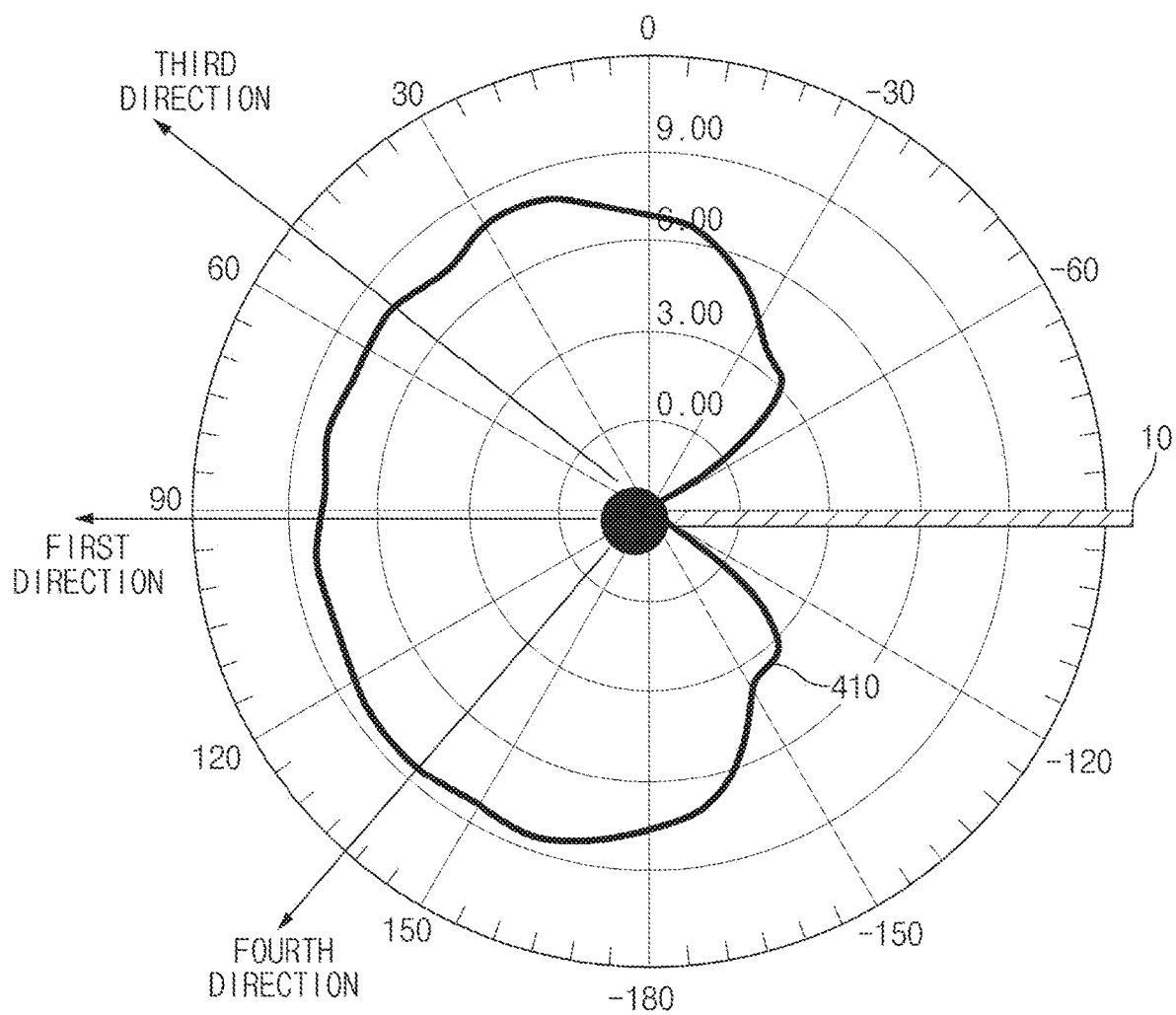
FIG. 4A is a view illustrating a beam pattern of a communication module not assembled at a housing according to an embodiment of the disclosure.

FIG. 4A is a view illustrating a beam pattern of a communication module not assembled at a housing according to an embodiment of the disclosure. In the disclosure, a communication module 10 according to a comparative example may mean a communication module which does not include the dielectric substance 230 and the conductor 240 of FIG. 3. A beam pattern illustrated in FIG. 4A may indicate a beam pattern of the communication module 10, which is measured in a state where the beam pattern is not affected by any other parts.

Figure 4B:
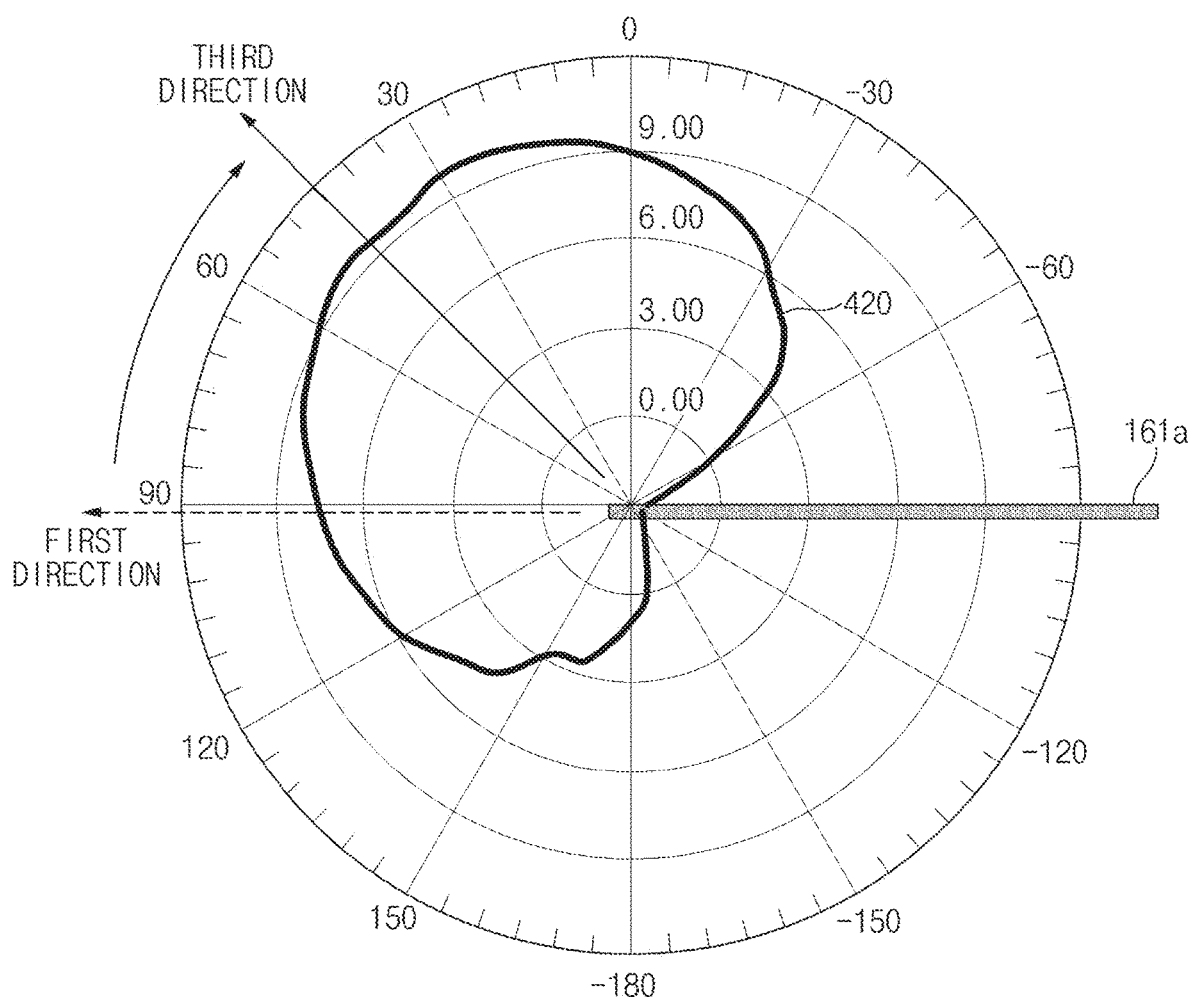
FIG. 4B is a view illustrating a beam pattern of a communication device according to an embodiment of the disclosure.

FIG. 4B is a view illustrating a beam pattern of a communication device according to an embodiment of the disclosure. A beam pattern illustrated in FIG. 4B may indicate a beam pattern of the first communication device 161a (or the first antenna array 220) measured in the case where the conductor 240 is included under the condition of FIG. 4A. In this case, a main radiation direction may be changed from the first direction to the third direction.

Figure 4C:
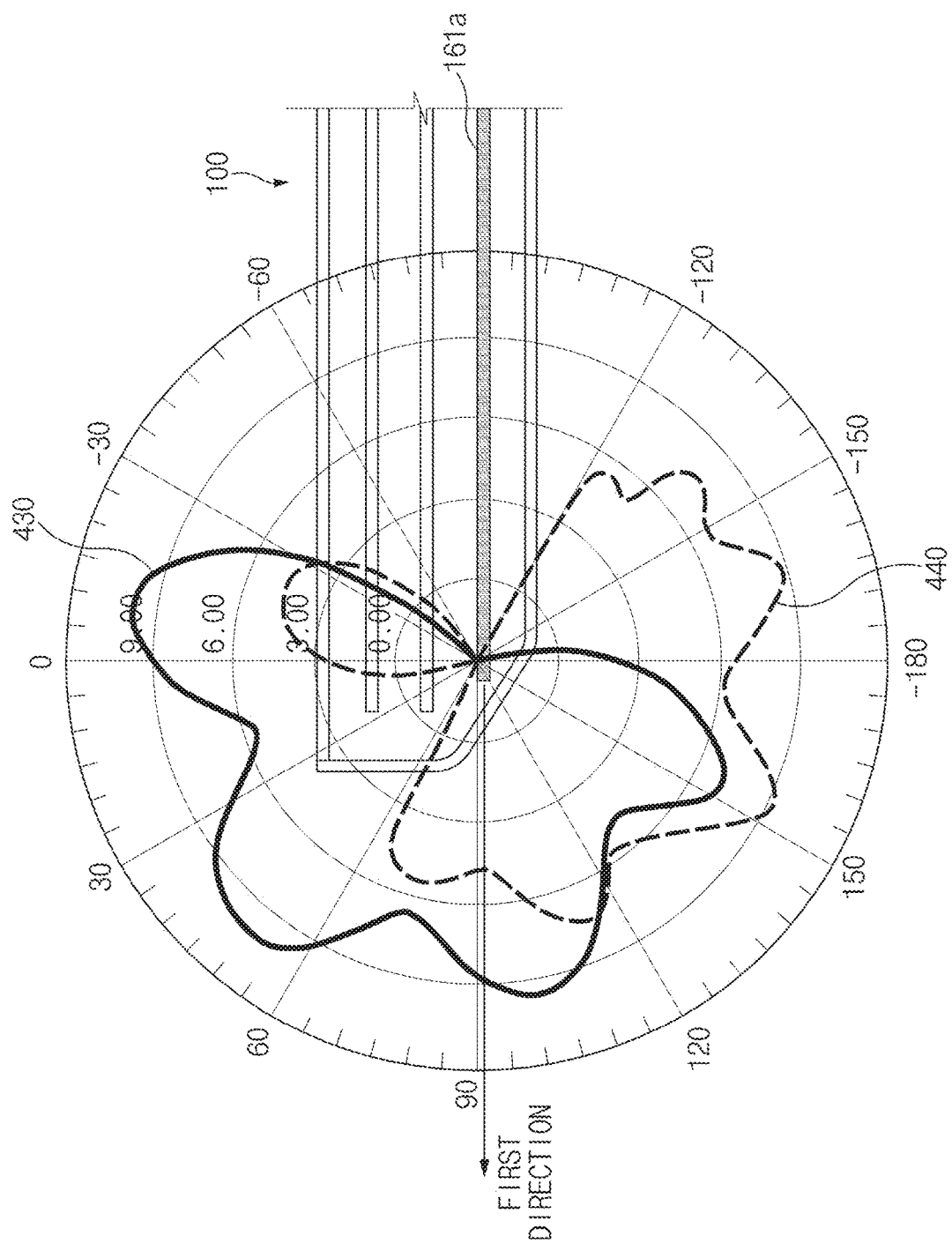
FIG. 4C is a view illustrating a cross section and a beam pattern of an electronic device according to an embodiment of the disclosure.

FIG. 4C is a view illustrating a cross section and a beam pattern of an electronic device according to an embodiment of the disclosure. FIG. 4C shows a beam pattern formed by the first communication device 161a (or the first antenna array 220) in the case where the first communication device 161a according to an embodiment of the disclosure is positioned in the electronic device 100.

Referring to FIG. 4A, the communication module 10 according to the comparative example may be a communication module which is not assembled at a housing and does not include the conductor 240. The communication module 10 may radiate a signal in a direction (e.g., the first direction), which is parallel to the communication module 10, as a main radiation direction. Also, since the communication module 10 according to the comparative example is not assembled at the housing and does not include the conductor 240, a beam pattern 410 may maintain radiation performance in the first direction, the third direction, and the fourth direction.

Referring to FIG. 4B, since the first communication device 161a according to an embodiment of the disclosure includes the conductor 240, the first communication device 161a may radiate a signal mainly in an oblique direction (e.g., the third direction) with respect to a plane where the first communication device 161a is positioned. For example, as the conductor 240 reflects a signal radiated toward a rear surface, a main radiation direction in which the signal is radiated may be changed from the first direction to the third direction.

According to various embodiments, as the conductor 240 is positioned at the first communication device 161a, a direction of a beam pattern 420 may be changed. For example, as a main radiation direction of a signal is changed to the third direction, the beam pattern may be formed between approximately −30° and approximately 150°. The size of the beam pattern 420 may be somewhat small at approximately −30° and approximately 150°, but may maintain 9 dB between 0° and 120°.

Referring to FIG. 4C, if the first communication device 161a according to an embodiment of the disclosure is positioned in the electronic device 100, the first communication device 161a may have an influence on the cover glass 110, the rear cover 120, the display 130, the first PCB 140, or the like. A radiation pattern 440 of a dotted line may be a radiation pattern of the first antenna array 220 when the first communication device 161a is positioned at the electronic device 100 without the dielectric substance 230 and the conductor 240. A null region may be formed toward a contact point of the cover glass 110 and the rear cover 120, and the radiation pattern 440 may be biased toward a lower end of the drawing. A radiation pattern 430 of a solid line may be a radiation pattern of the first antenna array 220 when the dielectric substance 230 and the conductor 240 are applied to the first communication device 161a. A radiation direction may be changed toward an upper end of the drawing by the conductor 240, and the null region may be decreased by the dielectric substance 230. A lower end portion of the drawing may be covered by a radiation pattern of the second antenna array 260. The electronic device 100 according to various embodiments of the disclosure may include the conductor 240 and the dielectric substance 230 in the first communication device 161a, thereby making it possible to make the reduction of performance due to any other part(s) or housings small or to complement the performance.

Figure 5A:
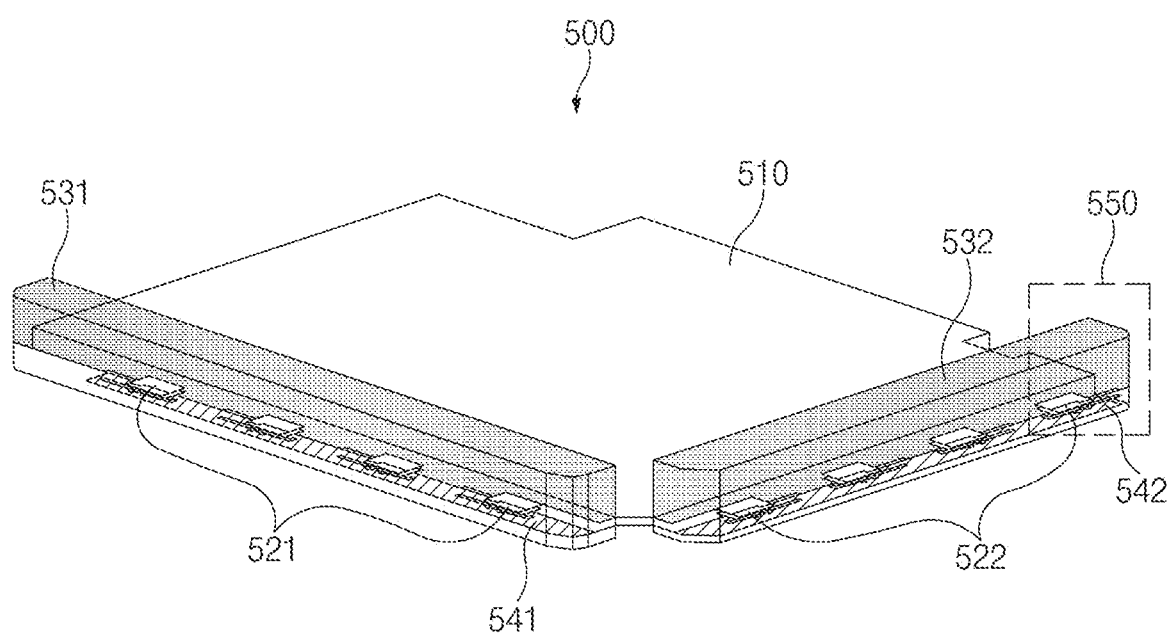
FIG. 5A is a view illustrating a communication device according to an embodiment of the disclosure.
Figure 5B:
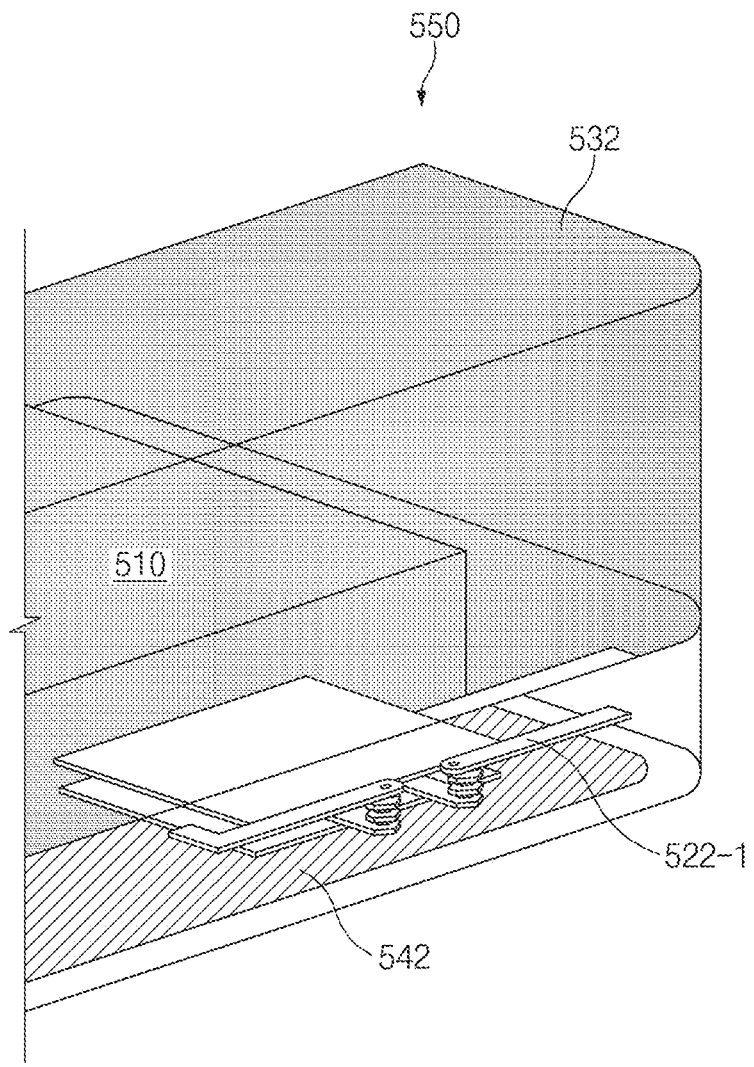
FIG. 5B is an enlarged view of a communication device according to an embodiment of the disclosure.

FIG. 5A is a view illustrating a communication device according to an embodiment of the disclosure. FIG. 5B is an enlarged view of a communication device according to an embodiment of the disclosure. FIG. 5B is an enlarged view of a partial region 550 illustrated in FIG. 5A according to an embodiment of the disclosure.

Referring to FIGS. 5A and 5B, a communication device 500 may include a PCB 510 (or a second PCB), a first antenna array 521, a second antenna array 522, a first dielectric substance 531, a second dielectric substance 532, a first conductor 541, and a second conductor 542.

According to various embodiments, the PCB 510 may be configured to mount the first antenna array 521, the second antenna array 522, the first dielectric substance 531, the second dielectric substance 532, the first conductor 541, and the second conductor 542. The description of the second PCB 210 given with reference to FIG. 2A may also be applied to the PCB 510.

According to an embodiment, the first antenna array 521 and the second antenna array 522 may be positioned on a periphery of the PCB 510. Each of the first antenna array 521 and the second antenna array 522 may include a plurality of antenna radiators (or antenna elements).

According to various embodiments, the first dielectric substance 531 may be positioned above the first antenna array 521, and the second dielectric substance 532 may be positioned above the second antenna array 522. The first dielectric substance 531 may make distortion of a signal radiated from the first antenna array 521 small. The second dielectric substance 532 may make distortion of a signal radiated from the second antenna array 522 small. For example, a null region occurring at a contact point of a front glass and a rear cover of a housing, which have different permittivities, may become small.

According to various embodiments, the first conductor 541 may be positioned below the first antenna array 521, and the second conductor 542 may be positioned below the second antenna array 522. The first conductor 541 may reflect a signal radiated from the first antenna array 521 and may change a direction of the signal. The second conductor 542 may reflect a signal radiated from the second antenna array 522 and may change a direction of the signal. According to various embodiments of the disclosure, the first conductor 541 and the second conductor 542 may include a conductive sheet.

Below, a detailed description will be given with reference to FIG. 5B. Each of radiators included in the second antenna array 522 may be extended from a side surface of the PCB 510. For example, a portion of a radiator 522-1 (included in the second antenna array 522) may be extended in a direction perpendicular to the side surface of the PCB 510. The remaining portion of the radiator 522-1 may be extended in a direction parallel to the side surface of the PCB 510. In the disclosure, the description given with regard to the second antenna array 522 may also be applied to the first antenna array 521.

According to various embodiments, the second dielectric substance 532 may be positioned above the second antenna array 522. A thickness of the second dielectric substance 532 may be thicker than a thickness of the PCB 510. According to an embodiment, the second dielectric substance 532 may be formed of substantially the same material (e.g., plastic) as the PCB 510. In the disclosure, the description given with regard to the second dielectric substance 532 may also be applied to the first dielectric substance 531.

According to various embodiments, the second conductor 542 may be positioned below the second antenna array 522. A thickness of the second conductor 542 may be relatively thinner than a thickness of the second dielectric substance 532 and the PCB 510. According to an embodiment, the second conductor 542 may be formed of a conductive material unlike the second dielectric substance 532 and the PCB 510. In the disclosure, the description given with regard to the second conductor 542 may also be applied to the first conductor 541.

Figure 6A:
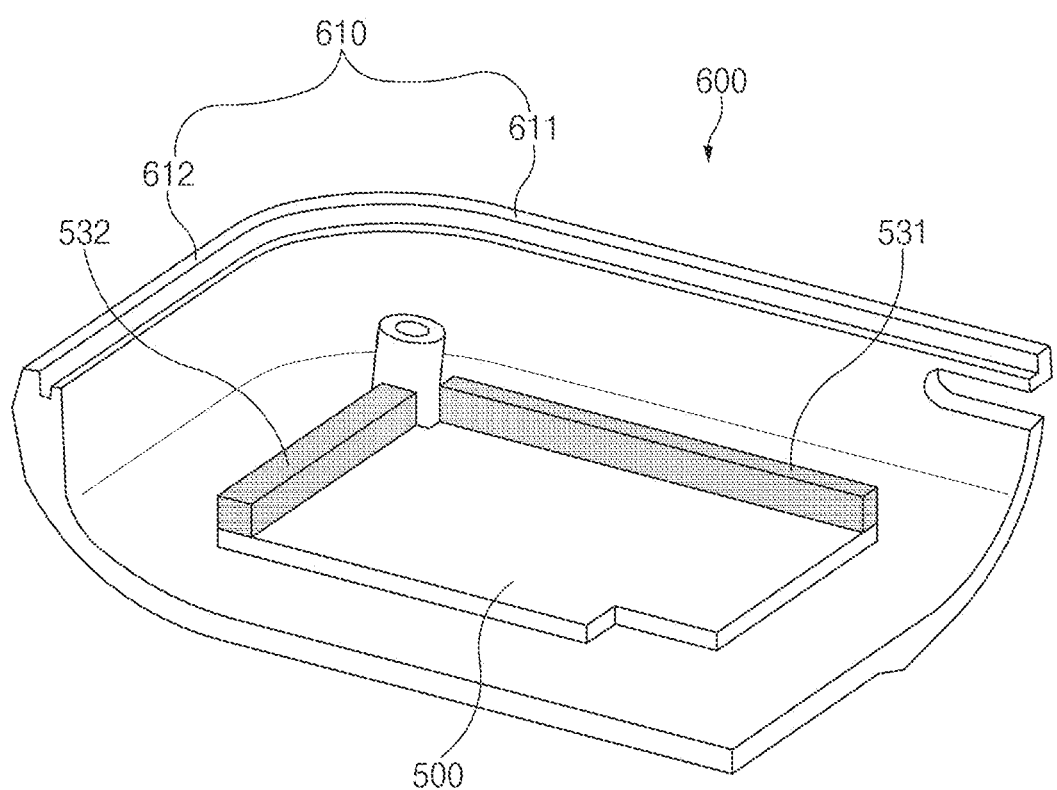
FIG. 6A is a view illustrating a mounting location of a communication device according to an embodiment of the disclosure.

FIG. 6A is a view illustrating a mounting location of a communication device according to an embodiment of the disclosure. FIG. 6A shows how the communication device 500 illustrated in FIG. 5A is mounted on a rear cover 610.

Figure 6B:
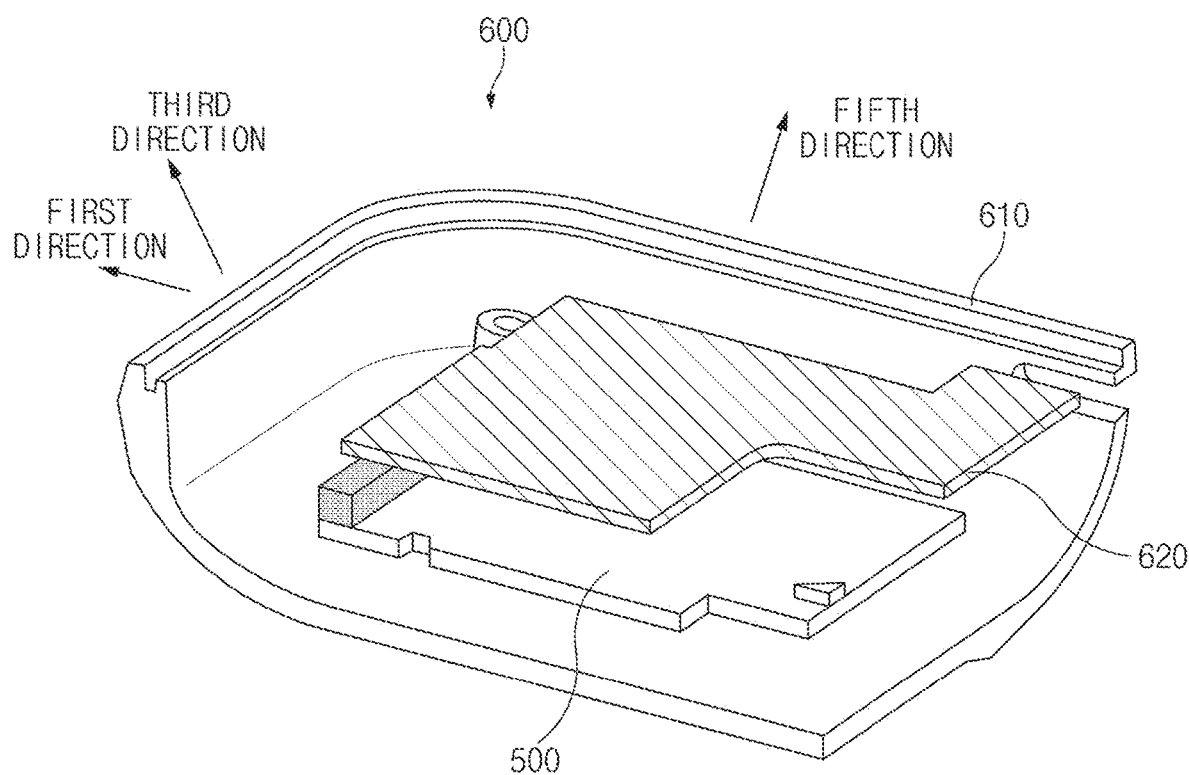
FIG. 6B is a view illustrating a communication device and a printed circuit board (PCB) according to an embodiment of the disclosure.

FIG. 6B is a view illustrating a communication device and a PCB according to an embodiment of the disclosure. FIG. 6B shows how a PCB 620 (or a first PCB) is mounted above the communication device 500 illustrated in FIG. 5A. According to various embodiments, a separation distance between the PCB 620 and the rear cover 610 may be more distant than a separation distance between the communication device 500 and the rear cover 610. In the disclosure, the description given with reference to FIG. 5 may be applied to components which have the same reference numerals (or marks) as the communication device 500 illustrated in FIG. 5.

Referring to FIGS. 6A and 6B, an electronic device 600 may include the rear cover 610 and the communication device 500. The rear cover 610 may form an appearance of a rear surface of the electronic device 600. The description given with regard to the rear cover 120 illustrated in FIG. 1 may also be applied to the rear cover 610.

According to various embodiments, the communication device 500 may be positioned adjacent to a periphery of the rear cover 610. For example, the communication device 500 may be interposed between a first side surface 611 and a second side surface 612. According to an embodiment, the communication device 500 may be attached to the rear cover 610 through an adhesive material.

Although not illustrated in FIG. 6A, the electronic device 600 may include a plurality of communication devices. Each of the communication devices may be positioned adjacent to a periphery of the rear cover 610. For example, the electronic device 600 may include four communication devices, and each of the four communication devices may be positioned on a corner of the rear cover 610. Also, each of the communication devices may be attached to the rear cover 610 through an adhesive material.

According to various embodiments, the PCB 620 (or a first PCB) may be positioned above the communication device 500. For example, since the first dielectric substance 531 and the second dielectric substance 532 have a given thickness, the PCB 620 may be mounted above the first dielectric substance 531 and the second dielectric substance 532. As such, the PCB 510 (or a second PCB) of the communication device 500 and the PCB 620 (or a first PCB) may have a separation distance as much as the thickness of the first dielectric substance 531 and the second dielectric substance 532. The description of the first PCB 140 given with reference to FIG. 1 may also be applied to the PCB 620.

According to various embodiments, as the electronic device 600 includes the first and second dielectric substances 531 and 532 and the first and second conductors 541 and 542, the electronic device 600 may make reduction of performance due to a housing and any other parts small or may complement the performance. For example, as the first conductor 541 is coupled to the first antenna array 521, a direction in which the first antenna array 521 may radiate a signal may be changed. The first antenna array 521 may radiate a signal mainly in the third direction in a state where the first conductor 541 is coupled to the first antenna array 521.

According to various embodiments, as the second conductor 542 is combined with the second antenna array 522, a direction in which the second antenna array 522 may radiate a signal may be changed. The second antenna array 522 may radiate a signal mainly in a fifth direction in a state where the second conductor 542 is combined with the second antenna array 522.

In the disclosure, the description given with reference to FIGS. 6A and 6B may be applied to components which have the same reference numerals (or marks) as the electronic device 600 illustrated in FIGS. 6A and 6B.

Figure 7:
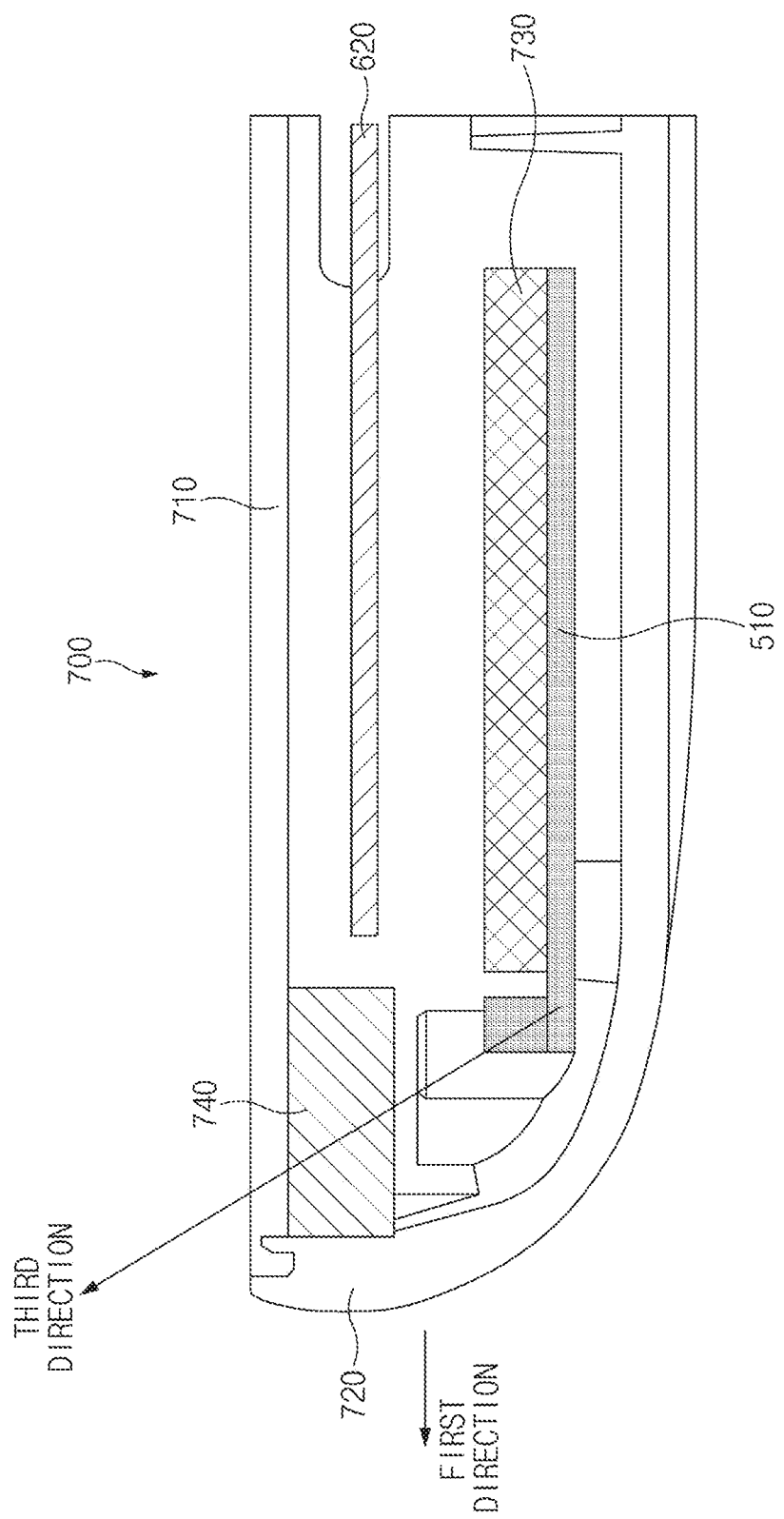
FIG. 7 is a sectional view of an electronic device according to an embodiment of the disclosure.

FIG. 7 is a sectional view of an electronic device according to an embodiment of the disclosure.

Referring to FIG. 7, an electronic device 700 may include a cover glass 710, a rear cover 720, the PCB 620, the PCB 510, a communication circuit 730, and an additional dielectric substance 740. The description of the cover glass 110 and the rear cover 120 given with reference to FIG. 1 may also be applied to the cover glass 710 and the rear cover 720.

The communication circuit 730 may be positioned at the PCB 510. The communication circuit 730 may feed the first antenna array 521 and the second antenna array 522. In the disclosure, the description of the communication circuit 250 given with reference to FIG. 2A may also be applied to the communication circuit 730 of FIG. 7.

In the case where the communication circuit 730 feeds the first antenna array 521, the first conductor 541 positioned below the first antenna array 521 may reflect a signal radiated from the first antenna array 521. As such, the first antenna array 521 may radiate a signal in the third direction, not in the first direction, as a main radiation direction.

According to various embodiments, the additional dielectric substance 740 may compensate for a permittivity difference between the cover glass 710 and the rear cover 720. For example, as the additional dielectric substance 740 is interposed between the cover glass 710 and the rear cover 720, a region (e.g., a null region) where the size of a beam pattern decreases may be prevented from occurring.

The electronic device 700 illustrated in FIG. 7 is only an embodiment, and the embodiments of the disclosure are not limited to illustration of FIG. 7. For example, it may be possible to decrease the null region by adjusting a thickness of the cover glass 710 and/or the rear cover 720.

An electronic device according to an embodiment of the disclosure may include a cover glass, a rear cover which faces away from the cover glass, and a plurality of communication devices that are interposed between the cover glass and the rear cover. Each of the plurality of communication devices may include a PCB, an antenna array positioned at the PCB, a dielectric substance positioned on one surface of the antenna array, a conductor positioned on an opposite surface of the antenna array, and a communication circuit electrically connected with the antenna array. The communication circuit may feed the antenna array and may transmit/receive a signal in a specified frequency band based on an electrical path formed through the antenna array.

The antenna array, according to an embodiment of the disclosure, may include a plurality of radiators, and the dielectric substance may be positioned on one side of the plurality of radiators.

The conductor, according to an embodiment of the disclosure, may be positioned on an opposite side of the plurality of radiators.

The PCB, according to an embodiment of the disclosure, may include a first surface, a second surface facing away from the first surface, and a side surface formed between the first surface and the second surface, and the antenna array may be interposed between the first surface and the second surface.

The communication circuit, according to an embodiment of the disclosure, may transmit/receive the signal in a direction having a specified slope with respect to the first surface.

The antenna array, according to an embodiment of the disclosure, may be positioned on a periphery of the PCB.

The cover glass and the rear cover, according to an embodiment of the disclosure, may have different permittivities.

The rear cover, according to an embodiment of the disclosure, may include a first edge, a second edge facing away from the first edge, a third edge connecting one end of the first edge and one end of the second edge, and a fourth edge connecting an opposite end of the first edge and an opposite end of the second edge.

The plurality of communication devices, according to an embodiment of the disclosure, may include a first communication device interposed between the first edge and the third edge, a second communication device interposed between the first edge and the fourth edge, a third communication device interposed between the second edge and the third edge, and a fourth communication device interposed between the second edge and the fourth edge.

The electronic device, according to an embodiment of the disclosure, may further include a display interposed between the cover glass and the communication devices.

Each of the plurality of communication devices, according to an embodiment of the disclosure, may further include a patch antenna formed on the PCB.

The communication circuit, according to an embodiment of the disclosure, may transmit/receive a first signal in a first direction based on an electrical path formed through the antenna array, may feed the patch antenna, and may transmit/receive a second signal in a second direction having a specified slope with respect to the first direction based on an electrical path formed through the patch antenna.

The electronic device, according to an embodiment of the disclosure, may further include an additional PCB interposed between the cover glass and the communication circuit.

A communication device, according to an embodiment of the disclosure, may include a PCB, a plurality of radiators positioned at the PCB, a dielectric substance positioned on one side of the plurality of radiators, a conductor positioned on an opposite side of the plurality of radiators, and a communication circuit electrically connected with the plurality of radiators. The communication circuit may feed the plurality of radiators and may transmit/receive a signal in a specified frequency band based on an electrical path formed through the plurality of radiators.

The PCB, according to an embodiment of the disclosure, may include a first surface, a second surface that faces away from the first surface, and a side surface that is formed between the first surface and the second surface, and each of the radiators may be interposed between the first surface and the second surface.

The communication circuit, according to an embodiment of the disclosure, may transmit/receive the signal in a direction having a specified slope with respect to the first surface.

The plurality of radiators, according to an embodiment of the disclosure, may be positioned on a periphery of the PCB.

The communication device, according to an embodiment of the disclosure, may further include a patch antenna formed on the PCB.

The communication circuit, according to an embodiment of the disclosure, may transmit/receive a first signal in a first direction based on an electrical path formed through the plurality of radiators, may feed the patch antenna, and may transmit/receive a second signal in a second direction having a specified slope with respect to the first direction based on an electrical path formed through the patch antenna.

An electronic device, according to an embodiment of the disclosure, may include a housing that includes a front plate, a rear plate facing away from the front plate, and a side member surrounding a space between the front plate and the rear plate, a touchscreen display that is exposed through the front plate, a first PCB that is parallel to the touchscreen display and the rear plate, is interposed between the touchscreen display and the rear plate, and is spaced from the front plate by a first distance, a second PCB that is parallel to the front plate and the rear plate, is interposed between the front plate and the rear plate, and is spaced from the front plate by a second distance longer than the first distance, wherein the second PCB overlaps partially with the touchscreen display when viewed from the front plate, an antenna array that includes a plurality of antenna elements positioned in a direction parallel to a portion of the side member along a side surface of the second PCB, a conductive structure that is interposed between the antenna array and the rear plate, a dielectric substance structure that is interposed between the antenna array and the front plate, a wireless communication circuit that is electrically connected with the antenna array and transmits/receives a signal in a frequency band ranging from 20 GHz to 40 GHz, and a processor that is electrically connected with the touchscreen display and the wireless communication circuit.

According to an embodiment of the disclosure, the second PCB may have a size smaller than the first PCB.

According to an embodiment of the disclosure, the second PCB may include a surface facing the rear plate, and the conductor structure may include a conductive sheet attached to the surface.

According to an embodiment of the disclosure, the electronic device may further include a matrix of antenna elements mounted on the second PCB.

Figure 8:
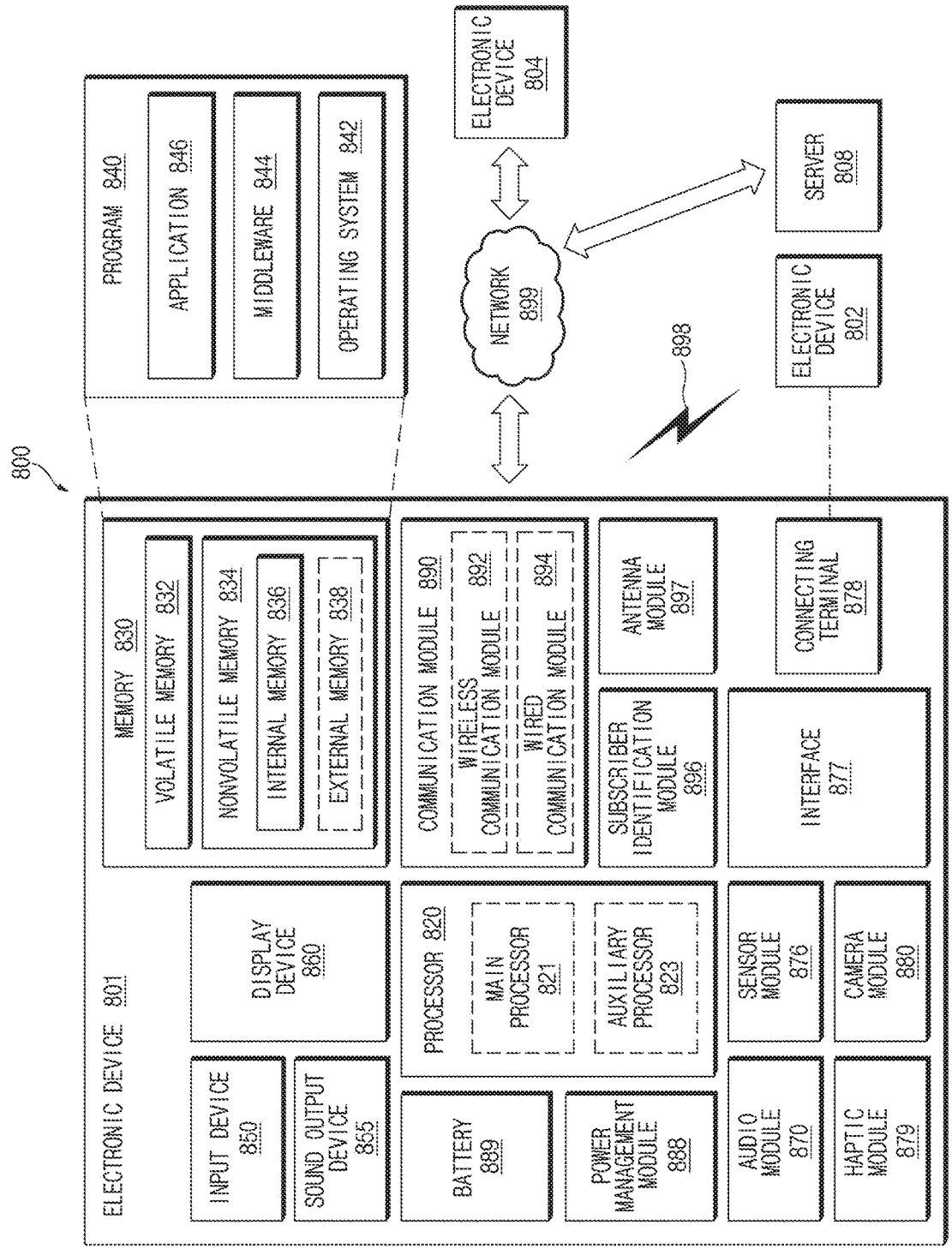
FIG. 8 is a block diagram of an electronic device in a network environment, according to an embodiment of the disclosure.

FIG. 8 is a block diagram of an electronic device in a network environment according to an embodiment of the disclosure.

Referring to FIG. 8, an electronic device 801 may communicate with an external electronic device 802 through a first network 898 (e.g., a short-range wireless communication) or may communicate with an external electronic device 804 or a server 808 through a second network 899 (e.g., a long-distance wireless communication) in a network environment 800. According to an embodiment, the electronic device 801 may communicate with the external electronic device 804 through the server 808. According to an embodiment, the electronic device 801 may include a processor 820, a memory 830, an input device 850, a sound output device 855, a display device 860, an audio module 870, a sensor module 876, an interface 877, a haptic module 879, a camera module 880, a power management module 888, a battery 889, a communication module 890, a subscriber identification module 896, and an antenna module 897. According to some embodiments, at least one (e.g., the display device 860 or the camera module 880) among components of the electronic device 801 may be omitted or other components may be added to the electronic device 801. According to some embodiments, some components may be integrated and implemented as in the case of the sensor module 876 (e.g., a fingerprint sensor, an iris sensor, or an illuminance sensor) embedded in the display device 860 (e.g., a display).

The processor 820 may operate, for example, software (e.g., a program 840) to control at least one of other components (e.g., a hardware or software component) of the electronic device 801 connected with the processor 820 and may process and compute a variety of data. The processor 820 may load a command set or data, which is received from other components (e.g., the sensor module 876 or the communication module 890), into a volatile memory 832, may process the loaded command or data, and may store result data into a nonvolatile memory 834. According to an embodiment, the processor 820 may include a main processor 821 (e.g., a central processing unit or an AP) and an auxiliary processor 823 (e.g., a graphic processing device, an image signal processor, a sensor hub processor, or a CP), which operates independently from the main processor 821, additionally or alternatively uses less power than the main processor 821, or is specified to a designated function. In this case, the auxiliary processor 823 may operate separately from the main processor 821 or embedded.

In this case, the auxiliary processor 823 may control, for example, at least some of functions or states associated with at least one component (e.g., the display device 860, the sensor module 876, or the communication module 890) among the components of the electronic device 801 instead of the main processor 821 while the main processor 821 is in an inactive (e.g., sleep) state or together with the main processor 821 while the main processor 821 is in an active (e.g., an application execution) state. According to an embodiment, the auxiliary processor 823 (e.g., the image signal processor or the CP) may be implemented as a part of another component (e.g., the camera module 880 or the communication module 890) that is functionally related to the auxiliary processor 823. The memory 830 may store a variety of data used by at least one component (e.g., the processor 820 or the sensor module 876) of the electronic device 801, for example, software (e.g., the program 840) and input data or output data with respect to commands associated with the software. The memory 830 may include the volatile memory 832 or the nonvolatile memory 834.

The program 840 may be stored in the memory 830 as software and may include, for example, an operating system 842, a middleware 844, or an application 846.

The input device 850 may be a device for receiving a command or data, which is used for a component (e.g., the processor 820) of the electronic device 801, from an outside (e.g., a user) of the electronic device 801 and may include, for example, a microphone, a mouse, or a keyboard.

The sound output device 855 may be a device for outputting a sound signal to the outside of the electronic device 801 and may include, for example, a speaker used for general purposes, such as multimedia play or recordings play, and a receiver used only for receiving calls. According to an embodiment, the receiver and the speaker may be either integrally or separately implemented.

The display device 860 may be a device for visually presenting information to the user of the electronic device 801 and may include, for example, a display, a hologram device, or a projector and a control circuit for controlling a corresponding device. According to an embodiment, the display device 860 may include a touch circuitry or a pressure sensor for measuring an intensity of pressure on the touch.

The audio module 870 may convert a sound and an electrical signal in dual directions. According to an embodiment, the audio module 870 may obtain the sound through the input device 850 or may output the sound through an external electronic device (e.g., the external electronic device 802 (e.g., a speaker or a headphone)) wired or wirelessly connected with the sound output device 855 or the electronic device 801.

The sensor module 876 may generate an electrical signal or a data value corresponding to an operating state (e.g., power or temperature) inside or an environmental state outside the electronic device 801. The sensor module 876 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 877 may support a designated protocol wired or wirelessly connected with the external electronic device (e.g., the external electronic device 802). According to an embodiment, the interface 877 may include, for example, an HDMI (high-definition multimedia interface), a USB (universal serial bus) interface, an SD card interface, or an audio interface.

A connecting terminal 878 may include a connector that physically connects the electronic device 801 to the external electronic device (e.g., the external electronic device 802), for example, an HDMI connector, a USB connector, an SD card connector, or an audio connector (e.g., a headphone connector).

The haptic module 879 may convert an electrical signal to a mechanical stimulation (e.g., vibration or movement) or an electrical stimulation perceived by the user through tactile or kinesthetic sensations. The haptic module 879 may include, for example, a motor, a piezoelectric element, or an electric stimulator.

The camera module 880 may shoot a still image or a video image. According to an embodiment, the camera module 880 may include, for example, at least one lens, an image sensor, an image signal processor, or a flash.

The power management module 888 may be a module for managing power supplied to the electronic device 801 and may serve as at least a part of a power management integrated circuit (PMIC).

The battery 889 may be a device for supplying power to at least one component of the electronic device 801 and may include, for example, a non-rechargeable (primary) battery, a rechargeable (secondary) battery, or a fuel cell.

The communication module 890 may establish a wired or wireless communication channel between the electronic device 801 and the external electronic device (e.g., the external electronic device 802, the external electronic device 804, or the server 808) and support communication execution through the established communication channel. The communication module 890 may include at least one CP operating independently from the processor 820 (e.g., the AP) and supporting the wired communication or the wireless communication. According to an embodiment, the communication module 890 may include a wireless communication module 892 (e.g., a cellular communication module, a short-range wireless communication module, or a GNSS (global navigation satellite system) communication module) or a wired communication module 894 (e.g., an LAN (local area network) communication module or a power line communication module) and may communicate with the external electronic device using a corresponding communication module among them through the first network 898 (e.g., the short-range communication network such as a Bluetooth, a Wi-Fi direct, or an IrDA (infrared data association)) or the second network 899 (e.g., the long-distance wireless communication network such as a cellular network, an internet, or a computer network (e.g., LAN or WAN)). The above-mentioned various communication modules may be implemented into one chip or into separate chips, respectively.

According to an embodiment, the wireless communication module 892 may identify and authenticate the electronic device 801 using user information stored in the subscriber identification module 896 in the communication network.

The antenna module 897 may include one or more antennas to transmit or receive the signal or power to or from an external source. According to an embodiment, the communication module 890 (e.g., the wireless communication module 892) may transmit or receive the signal to or from the external electronic device through the antenna suitable for the communication method.

Some components among the components may be connected with each other through a communication method (e.g., a bus, a general purpose input/output (GPIO), an serial peripheral interface (SPI), or an mobile industry processor interface (MIPI)) used between peripheral devices to exchange signals (e.g., a command or data) with each other.

According to an embodiment, the command or data may be transmitted or received between the electronic device 801 and the external electronic device 804 through the server 808 connected with the second network 899. Each of the external electronic devices 802 and 804 may be the same or different types as or from the electronic device 801. According to an embodiment, all or some of the operations performed by the electronic device 801 may be performed by another electronic device or a plurality of external electronic devices. When the electronic device 801 performs some functions or services automatically or by request, the electronic device 801 may request the external electronic device to perform at least some of the functions related to the functions or services, in addition to or instead of performing the functions or services by itself. The external electronic device receiving the request may carry out the requested function or the additional function and transmit the result to the electronic device 801. The electronic device 801 may provide the requested functions or services based on the received result as is or after additionally processing the received result. To this end, for example, a cloud computing, distributed computing, or client-server computing technology may be used.

Figure 9:
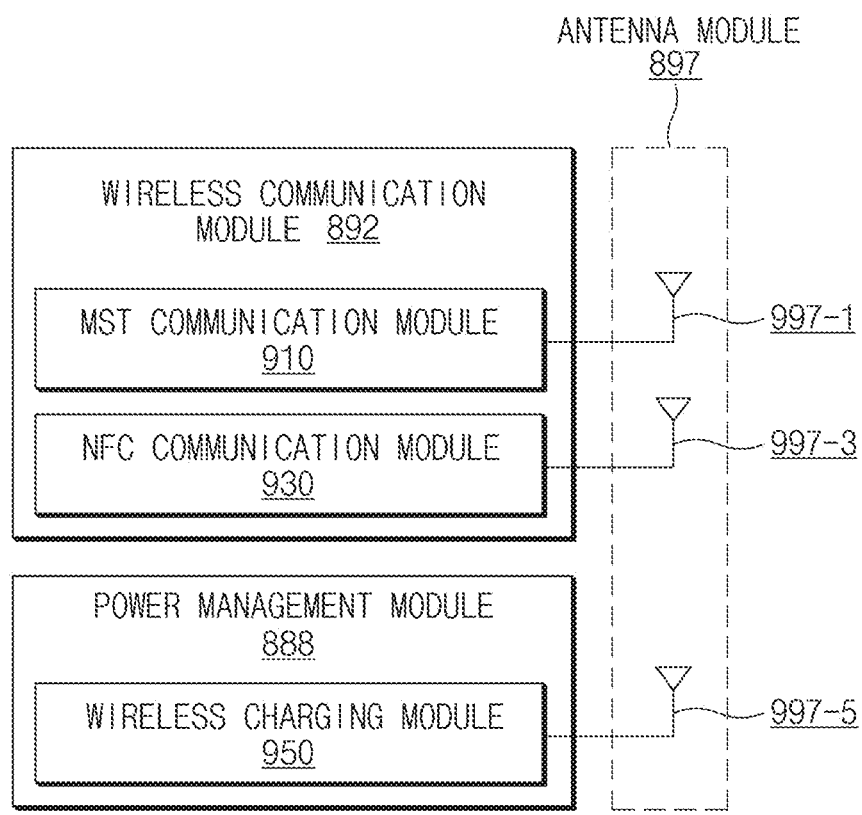
FIG. 9 is a block diagram illustrating a wireless communication module, a power management module, and an antenna module of an electronic device, according to an embodiment of the disclosure.

FIG. 9 illustrates a block diagram of a wireless communication module, a power management module, and an antenna module of an electronic device, according to an embodiment of this disclosure.

Referring to FIG. 9, the wireless communication module 892 may include a magnetic secure transmission (MST) communication module 910 or a near field communication (NFC) communication module 930, and the power management module 888 may include a wireless charging module 950. In this case, an antenna module 997 may separately include a plurality of antennas including an MST antenna 997-1 connected with the MST communication module 910, an NFC antenna 997-3 connected with the NFC communication module 930, and a wireless charging antenna 997-5 connected with the wireless charging module 950. To avoid redundancy, additional description associated with components which are the same as the components of FIG. 8 will be omitted or will be briefly described.

The MST communication module 910 may receive a signal (e.g., a signal including control information or payment information) from the processor 820, may generate a magnetic signal corresponding to the received signal through the MST antenna 997-1, and may transmit the generated magnetic signal to the external electronic device 802 (e.g., a POS device). According to an embodiment, for example, the MST communication module 910 may include a switching module (not illustrated) including one or more switches connected with the MST antenna 997-1, and may control the switching module to change a direction of a voltage or a current to be supplied to the MST antenna 997-1. A direction of a magnetic signal (e.g., a magnetic field) to be transmitted to the external electronic device 802 through the short-range wireless communication (e.g., the first network 898) may be changed, for example, by transmitting the magnetic signal through the MST antenna 997-1. The magnetic signal transmitted with the direction changed may cause a form and an effect which are similar to those of a magnetic field generated while (or when) a magnetic card is swiped by a card reader of the external electronic device 802. According to an embodiment, payment-related information and a control signal received from the external electronic device 802 in the form of the magnetic signal may be transmitted, for example, to a server (e.g., the server 808) through the second network 899.

The NFC communication module 930 may obtain a signal (e.g., control information or payment information) from the processor 820, and may transmit the obtained signal to the external electronic device 802 through the NFC antenna 997-3. According to an embodiment, the NFC communication module 930 may receive a signal (e.g., a signal including control information or payment information) transmitted from the external electronic device 802 through the NFC antenna 997-3.

The wireless charging module 950 may wirelessly transmit a power to the external electronic device 802 (e.g., a mobile phone or a wearable device) through the wireless charging antenna 997-5, or may wirelessly receive a power from the external electronic device 802 (e.g., a wireless charging device). The wireless charging module 950 may support various wireless charging manners, for example, including a magnetic resonance manner or a magnetic induction manner.

According to an embodiment, some of the MST antenna 997-1, the NFC antenna 997-3, or the wireless charging antenna 997-5 may mutually share at least a portion of a radiation unit (or radiator). For example, a radiation unit of the MST antenna 997-1 may be used as a radiation unit of the NFC antenna 997-3 or the wireless charging antenna 997-5, and vice versa. In the case where the MST antenna 997-1, the NFC antenna 997-3, or the wireless charging antenna 997-5 shares at least a partial region of a radiation unit, the antenna module 997 may include a switching circuit (not illustrated) for selectively connecting or separating (e.g., opening) at least some of the antennas 997-1, 997-3, and 997-5 under control of the wireless communication module 892 (e.g., the MST communication module 910 or the NFC communication module 930) or the power management module 888 (e.g., the wireless charging module 950). For example, in the case where the electronic device 801 uses a wireless charging function, the NFC communication module 930 or the wireless charging module 950 may control the switching circuit such that the at least a partial region of the radiation unit shared by the NFC antenna 997-3 and the wireless charging antenna 997-5 is temporarily separated from the NFC antenna 997-3 and is connected only with the wireless charging antenna 997-5.

According to an embodiment, at least a part of functions of the MST communication module 910, the NFC communication module 930, or the wireless charging module 950 may be controlled by an external processor (e.g., the processor 820). According to an embodiment, specified functions (e.g., a payment function) of the MST communication module 910 or the NFC communication module 930 may be performed in a trusted execution environment (TEE). The TEE, according to various embodiments, may be, for example, an execution environment in which at least a portion of a specified region of the memory 830 is assigned to perform a function (e.g., a financial transaction or a private information related function) needing a relatively high level of security and an access to the specified region is separately and restrictively allowed, for example, depending on an access subject or an application to be executed.

The electronic device according to various embodiments disclosed in the disclosure may be various types of devices. The electronic device may include, for example, at least one of a portable communication device (e.g., a smartphone), a computer device, a portable multimedia device, a mobile medical appliance, a camera, a wearable device, or a home appliance. The electronic device according to an embodiment of the disclosure should not be limited to the above-mentioned devices.

It should be understood that various embodiments of the disclosure and terms used in the embodiments do not intend to limit technologies disclosed in the disclosure to the particular forms disclosed herein; rather, the disclosure should be construed to cover various modifications, equivalents, and/or alternatives of embodiments of the disclosure. With regard to description of drawings, similar components may be assigned with similar reference numerals. As used herein, singular forms may include plural forms as well unless the context clearly indicates otherwise. In the disclosure disclosed herein, the expressions "A or B," "at least one of A or/and B," "A, B, or C," or "one or more of A, B, or/and C" and the like used herein may include any and all combinations of one or more of the associated listed items. The expressions "a first," "a second," "the first," or "the second," used in herein, may refer to various components regardless of the order and/or the importance, but do not limit the corresponding components. The above expressions are used merely for the purpose of distinguishing a component from the other components. It should be understood that when a component (e.g., a first component) is referred to as being (operatively or communicatively) "connected," or "coupled," to another component (e.g., a second component), it may be directly connected or coupled directly to the other component or any other component (e.g., a third component) may be interposed between them.

The term "module" used herein may represent, for example, a unit including one or more combinations of hardware, software and firmware. The term "module" may be interchangeably used with the terms "logic," "logical block," "part," and "circuit." The "module" may be a minimum unit of an integrated part or may be a part thereof. The "module" may be a minimum unit for performing one or more functions or a part thereof. For example, the "module" may include an application-specific integrated circuit (ASIC).

Various embodiments of the disclosure may be implemented by software (e.g., the program 840) including an instruction stored in a machine-readable storage media (e.g., an internal memory 836 or an external memory 838) readable by a machine (e.g., a computer). The machine may be a device that calls the instruction from the machine-readable storage media and operates depending on the called instruction and may include the electronic device (e.g., the electronic device 801). When the instruction is executed by the processor (e.g., the processor 820), the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory," as used herein, is a limitation of the medium itself (i.e., tangible, not a signal) as opposed to a limitation on data storage persistency.

According to an embodiment, the method according to various embodiments disclosed in the disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a Play Store™). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components (e.g., the module or the program) may be integrated in one component and may perform the same or similar functions performed by each corresponding components prior to the integration. Operations performed by a module, a programming, or other components according to various embodiments of the disclosure may be executed sequentially, in parallel, repeatedly, or in a heuristic method. Also, at least some operations may be executed in different sequences, omitted, or other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

Figure 10:
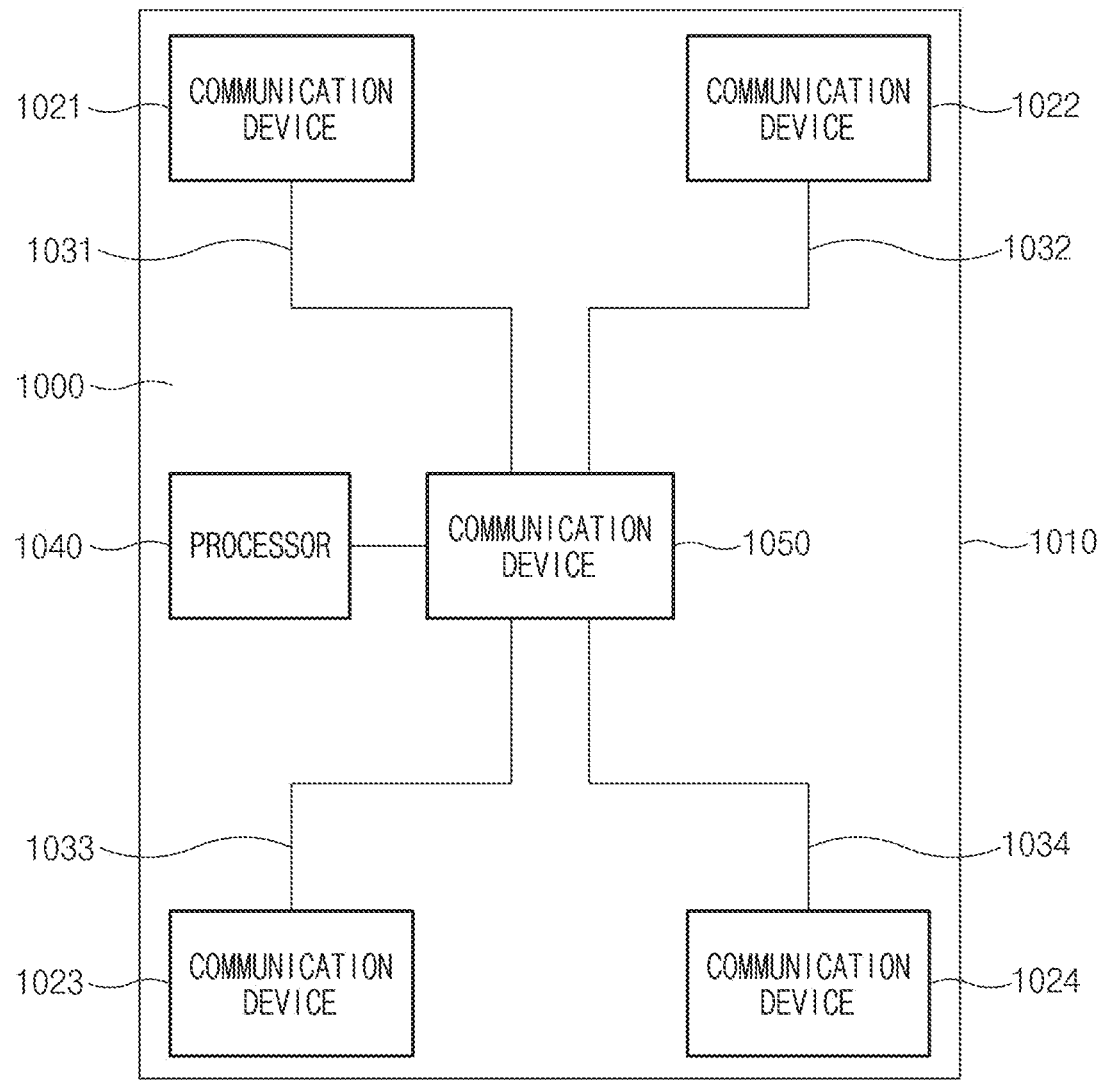
FIG. 10 is a view illustrating an example of an electronic device supporting 5G communication according to an embodiment of the disclosure.

FIG. 10 is a view illustrating an example of an electronic device supporting 5G communication according to an embodiment of the disclosure.

Referring to FIG. 10, an electronic device 1000 may include a housing 1010, a processor 1040, a communication device 1050 (e.g., the communication module 890 of FIG. 8), a first communication device 1021, a second communication device 1022, a third communication device 1023, a fourth communication device 1024, a first conductive line 1031, a second conductive line 1032, a third conductive line 1033, or a fourth conductive line 1034.

According to an embodiment, the housing 1010 may protect any other components of the electronic device 1000. The housing 1010 may include, for example, a front plate, a back plate facing away from the front plate, and a side member (or a metal frame) surrounding a space between the front plate and the back plate. The side member may be attached to the back plate or may be integrally formed with the back plate.

According to an embodiment, the electronic device 1000 may include at least one communication device. For example, the electronic device 1000 may include the first communication device 1021, the second communication device 1022, the third communication device 1023, or the fourth communication device 1024.

According to an embodiment, the first communication device 1021, the second communication device 1022, the third communication device 1023, or the fourth communication device 1024 may be positioned within the housing 1010. According to an embodiment, when viewed from above the front plate of the electronic device 1000, the first communication device 1021 may be positioned at an upper left end of the electronic device 1000, the second communication device 1022 may be positioned at an upper right end of the electronic device 1000, the third communication device 1023 may be positioned at a lower left end of the electronic device 1000, and the fourth communication device 1024 may be positioned at a lower right end of the electronic device 1000.

According to an embodiment, the processor 1040 may include one or more of a central processing unit, an AP, a graphic processing unit (GPU), an image signal processor of a camera, or a baseband processor (or a CP). According to an embodiment, the processor 1040 may be implemented with a system on chip (SoC) or a system in package (SiP).

According to an embodiment, the communication device 1050 may be electrically connected with at least one communication device by using at least one conductive line. For example, the communication device 1050 may be electrically connected with the first communication device 1021, the second communication device 1022, the third communication device 1023, or the fourth communication device 1024 by using the first conductive line 1031, the second conductive line 1032, the third conductive line 1033, or the fourth conductive line 1034. The communication device 1050 may include a baseband processor, an RFIC, or an IFIC. The communication device 1050 may include a baseband processor which is independent of the processor 1040 (e.g., an AP). The first conductive line 1031, the second conductive line 1032, the third conductive line 1033, or the fourth conductive line 1034 may include, for example, a coaxial cable or an FPCB.

According to an embodiment, the communication device 1050 may include a first baseband processor (BP) (not illustrated) or a second BP (not illustrated). The electronic device 1000 may further include one or more interfaces for supporting inter-chip communication between the first BP (or the second BP) and the processor 1040. The processor 1040 and the first BP or the second BP may transmit/receive data by using the inter-chip interface (e.g., an inter processor communication channel).

According to an embodiment, the first BP or the second BP may provide an interface for performing communication with any other entities. The first BP may support, for example, wireless communication with regard to a first network (not illustrated). The second BP may support, for example, wireless communication with regard to a second network (not illustrated).

According to an embodiment, the first BP or the second BP may form one module with the processor 1040. For example, the first BP or the second BP may be integrally formed with the processor 1040. For another example, the first BP or the second BP may be positioned within one chip or may be implemented in the form of an independent chip. According to an embodiment, the processor 1040 and at least one baseband processor (e.g., the first BP) may be integrally formed within one chip (an SoC), and another baseband processor (e.g., the second BP) may be implemented in the form of an independent chip.

According to an embodiment, the first network (not illustrated) or the second network (not illustrated) may correspond to the second network 899 of FIG. 8. According to an embodiment, the first network (not illustrated) and the second network (not illustrated) may include a 4G network and a 5G network, respectively. The 4G network may support, for example, a long term evolution (LTE) protocol defined in the 3GPP. The 5G network may support, for example, a new radio (NR) protocol defined in the 3GPP.

Figure 11:
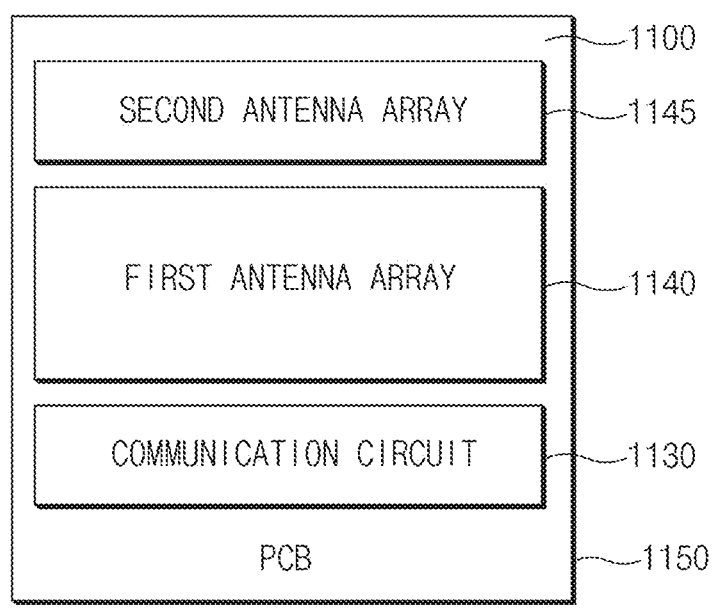
FIG. 11 is a block diagram illustrating an example of a communication device according to an embodiment of the disclosure.

FIG. 11 is a block diagram illustrating an example of a communication device according to an embodiment of the disclosure.

Referring to FIG. 11, a communication device 1100 may include a communication circuit 1130 (e.g., an RFIC), a PCB 1150, and at least one antenna array (e.g., a first antenna array 1140 or a second antenna array 1145).

According to an embodiment, a communication circuit or at least one antenna array may be positioned on or in the PCB 1150. For example, the first antenna array 1140 or the second antenna array 1145 may be positioned on a first surface of the PCB 1150, and the communication circuit 1130 may be positioned on a second surface of the PCB 1150. The PCB 1150 may include a coaxial cable connector or a board to board (B-to-B) connector for electrical connection with any other PCB (e.g., a PCB on which the communication device 1050 of FIG. 10 is positioned) by using a transmission line (e.g., the first conductive line 1031 of FIG. 10 or a coaxial cable). The PCB 1150 may be connected with the PCB, on which the communication device 1050 is positioned, for example, by using a coaxial cable, and the coaxial cable may be used to transmit a receive/transmit an intermediate frequency (IF) or radio frequency (RF) signal. For another example, a power or any other control signal may be provided through the B-to-B connector.

According to an embodiment, the first antenna array 1140 or the second antenna array 1145 may include a plurality of antenna elements. The plurality of antenna elements may include a patch antenna or a dipole antenna. For example, an antenna element included in the first antenna array 1140 may be a patch antenna for forming a beam toward a back plate of the electronic device 1000. For another example, an antenna element included in the second antenna array 1145 may be a dipole antenna for forming a beam toward a side member of the electronic device 1000.

According to an embodiment, the communication circuit 1130 may support a frequency band ranging from 24 GHz to 30 GHz or ranging from 37 GHz to 40 GHz. According to an embodiment, the communication circuit 1130 may up-convert or down-convert a frequency. For example, a communication circuit included in the first communication device 1021 may up-convert an IF signal received from the communication device 1050 through the first conductive line 1031. For another example, the communication circuit may down-convert a millimeter wave signal received through the first antenna array 1140 or the second antenna array 1145 included in the first communication device 1021 and may transmit the down-converted signal to the communication device 1050.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:
1. An electronic device comprising:
a cover glass;
a rear cover facing away from the cover glass; and
a plurality of communication devices interposed between the cover glass and the rear cover,
wherein each of the plurality of communication devices comprises:
a printed circuit board (PCB),
an antenna array positioned at the PCB, the antenna array comprising a first surface facing a first direction and a second surface facing a second direction opposite to the first direction, the antenna array further comprising a plurality of radiators disposed in the PCB, a dielectric substance positioned in the first direction from the first surface of the antenna array, no electrical component at the PCB being interposed between the dielectric substance and the first surface of the antenna array in the first direction, the dielectric substance being disposed over the plurality of radiators and configured to reduce distortion of at least one signal radiated by the antenna array, a conductor positioned in the second direction from the second surface of the antenna array and configured to change a direction of at least part of signals radiated by the antenna array from a third direction to a fourth direction, and a communication circuit electrically connected with the antenna array, and wherein the communication circuit is configured to:
feed the antenna array, and
at least one of transmit or receive a signal in a specified frequency band based on an electrical path formed through the antenna array.

2. The electronic device of claim 1, wherein the dielectric substance is positioned on one side of the plurality of radiators.

3. The electronic device of claim 2, wherein the conductor is positioned on an opposite side of the plurality of radiators.

4. The electronic device of claim 1,
wherein the PCB comprises:
a first surface,
a second surface facing away from the first surface, and
a side surface formed between the first surface and the second surface, and
wherein the antenna array is interposed between the first surface and the second surface of the PCB.

5. The electronic device of claim 4, wherein the communication circuit is further configured to at least one of transmit or receive the signal in a direction having a specified slope with respect to the first surface.

6. The electronic device of claim 1, wherein the antenna array is positioned on a periphery of the PCB.

7. The electronic device of claim 1, wherein the cover glass and the rear cover have different permittivities.

8. The electronic device of claim 1, wherein the rear cover comprises:
a first edge,
a second edge facing away from the first edge,
a third edge connecting one end of the first edge and one end of the second edge, and
a fourth edge connecting an opposite end of the first edge and an opposite end of the second edge.

9. The electronic device of claim 8, wherein the plurality of communication devices comprises:
a first communication device interposed between the first edge and the third edge,
a second communication device interposed between the first edge and the fourth edge,
a third communication device interposed between the second edge and the third edge, and
a fourth communication device interposed between the second edge and the fourth edge.

10. The electronic device of claim 1, further comprising a display interposed between the cover glass and the plurality of communication devices.

11. The electronic device of claim 1, wherein each of the plurality of communication devices further comprise a patch antenna formed on the PCB.

12. The electronic device of claim 11, wherein the communication circuit is further configured to:

at least one of transmit or receive a first signal in a direction based on the electrical path formed through the antenna array;
feed the patch antenna; and
at least one of transmit or receive a second signal in another direction having a specified slope with respect to the direction based on an electrical path formed through the patch antenna.

13. The electronic device of claim 1, further comprising an additional PCB interposed between the cover glass and the communication circuit.

14. A communication device comprising:
a printed circuit board (PCB);
a plurality of radiators positioned in the PCB, the plurality of radiators comprising a first side facing a first direction and a second side facing a second direction opposite to the first direction;
a dielectric substance positioned in the first direction from the first side of the plurality of radiators, no electrical component at the PCB being interposed between the dielectric substance and the first side of the plurality of radiators in the first direction, the dielectric substance being disposed over the plurality of radiators and configured to reduce distortion of at least one signal radiated from at least one of the plurality of radiators;
a conductor positioned in the second direction from the second side of the plurality of radiators and configured to change a direction of at least part of signals radiated by the plurality of radiators from a third direction to a fourth direction; and
a communication circuit electrically connected with the plurality of radiators,
wherein the communication circuit is configured to:
feed the plurality of radiators, and
at least one of transmit or receive a signal in a specified frequency band based on an electrical path formed through the plurality of radiators, and
wherein the fourth direction is an oblique direction with respect to a plane where the communication device is positioned.

15. The communication device of claim 14,
wherein the PCB comprises:
a first surface,
a second surface facing away from the first surface, and
a side surface formed between the first surface and the second surface, and
wherein each of the plurality of radiators is interposed between the first surface and the second surface.

16. The communication device of claim 15, wherein the communication circuit is further configured to at least one of transmit or receive the signal in a direction having a specified slope with respect to the first surface.

17. The communication device of claim 14, wherein the plurality of radiators are positioned on a periphery of the PCB.

18. The communication device of claim 14, further comprising a patch antenna formed on the PCB.

19. The communication device of claim 18, wherein the communication circuit is further configured to:
at least one of transmit or receive a first signal in a direction based on the electrical path formed through the radiators;
feed the patch antenna; and
at least one of transmit or receive a second signal in another direction having a specified slope with respect to the direction based on an electrical path formed through the patch antenna.

20. An electronic device comprising:
a housing comprising:
 a front plate,
 a rear plate facing away from the front plate, and
 a side member surrounding a space between the front plate and the rear plate;
a touchscreen display exposed through the front plate;
a first printed circuit board (PCB) that is parallel to both the touchscreen display and the rear plate, the first PCB being interposed between the touchscreen display and the rear plate and spaced from the front plate by a first distance;
a second PCB that is parallel to both the front plate and the rear plate, the second PCB being interposed between the front plate and the rear plate and spaced from the front plate by a second distance longer than the first distance, the second PCB overlapping partially with the touchscreen display when viewed from the front plate;
an antenna array including a plurality of antenna elements positioned in the second PCB in a direction parallel to a portion of the side member along a side surface of the second PCB, the antenna array comprising a first surface facing a first direction and a second surface facing a second direction opposite to the first direction;
a conductive structure interposed between the antenna array and the rear plate and configured to change a direction of at least part of signals radiated by the antenna array from a third direction to a fourth direction;
a dielectric substance structure interposed between the antenna array and the front plate, no electrical component at the second PCB being interposed between the dielectric substance structure and a surface of the antenna array in the first direction, the dielectric substance structure being disposed over the plurality of antenna elements and configured to reduce distortion of at least one signal radiated from the antenna array;
a wireless communication circuit electrically connected to the antenna array and configured to at least one of transmit or receive a signal in a frequency band ranging from 20 GHz to 40 GHz; and
a processor electrically connected with the touchscreen display and the wireless communication circuit,
wherein the fourth direction is an oblique direction with respect to a plane where the antenna array is positioned.

21. The electronic device of claim 1, wherein the dielectric substance is located on a same plane as the communication circuit.

22. The electronic device of claim 1,
wherein an edge of the communication circuit faces an edge of the dielectric substance, and
wherein the edge of the communication circuit is shorter than the edge of the dielectric substance.

* * * * *